(12) United States Patent
Satou

(10) Patent No.: US 8,966,143 B2
(45) Date of Patent: Feb. 24, 2015

(54) METHOD FOR CONTROLLING STORAGES AND STORAGE CONTROL APPARATUS

(71) Applicant: Fujitsu Limited, Kawasaki-shi, Kanagawa (JP)

(72) Inventor: Akira Satou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 51 days.

(21) Appl. No.: 13/949,859

(22) Filed: Jul. 24, 2013

(65) Prior Publication Data

US 2014/0052942 A1 Feb. 20, 2014

(30) Foreign Application Priority Data

Aug. 15, 2012 (JP) ................. 2012-180210

(51) Int. Cl.
*G06F 3/06* (2006.01)
*G06F 12/00* (2006.01)
*G06F 5/00* (2006.01)
*G06F 13/38* (2006.01)

(52) U.S. Cl.
CPC .............. *G06F 12/00* (2013.01); *G06F 3/0611* (2013.01); *G06F 3/0647* (2013.01); *G06F 3/0685* (2013.01)
USPC ............ 710/62; 710/2; 710/5; 710/8; 710/11; 710/32

(58) Field of Classification Search
None
See application file for complete search history.

(56) References Cited

U.S. PATENT DOCUMENTS

| 5,666,512 A | 9/1997 | Nelson et al. |
| 2003/0140207 A1 | 7/2003 | Nagase et al. |
| 2006/0047930 A1 | 3/2006 | Takahashi et al. |
| 2007/0078901 A1 | 4/2007 | Satou et al. |
| 2010/0281230 A1* | 11/2010 | Rabii et al. ...................... 711/165 |
| 2014/0046908 A1* | 2/2014 | Patiejunas et al. ............. 707/687 |

FOREIGN PATENT DOCUMENTS

| JP | 8-221876 | 8/1996 |
| JP | 2003-216460 | 7/2003 |
| JP | 2006-99748 | 4/2006 |
| JP | 2007-94946 | 4/2007 |

* cited by examiner

*Primary Examiner* — Scott Sun
(74) *Attorney, Agent, or Firm* — Staas & Halsey LLP

(57) ABSTRACT

A method, executed by a computer, for controlling storages includes obtaining time elapsed since data to be moved in a source storage in three or more storages whose performance for response to an access request is different is accessed in accordance with the access request, identifying, from the storages, a destination storage that meets condition under which the data to be moved in the source storage is moved, based on the obtained elapsed time by referring to a storage unit that stores the condition under which data is moved to each of the storages, and moving the data to be moved in the source storage to the identified destination storage.

9 Claims, 23 Drawing Sheets

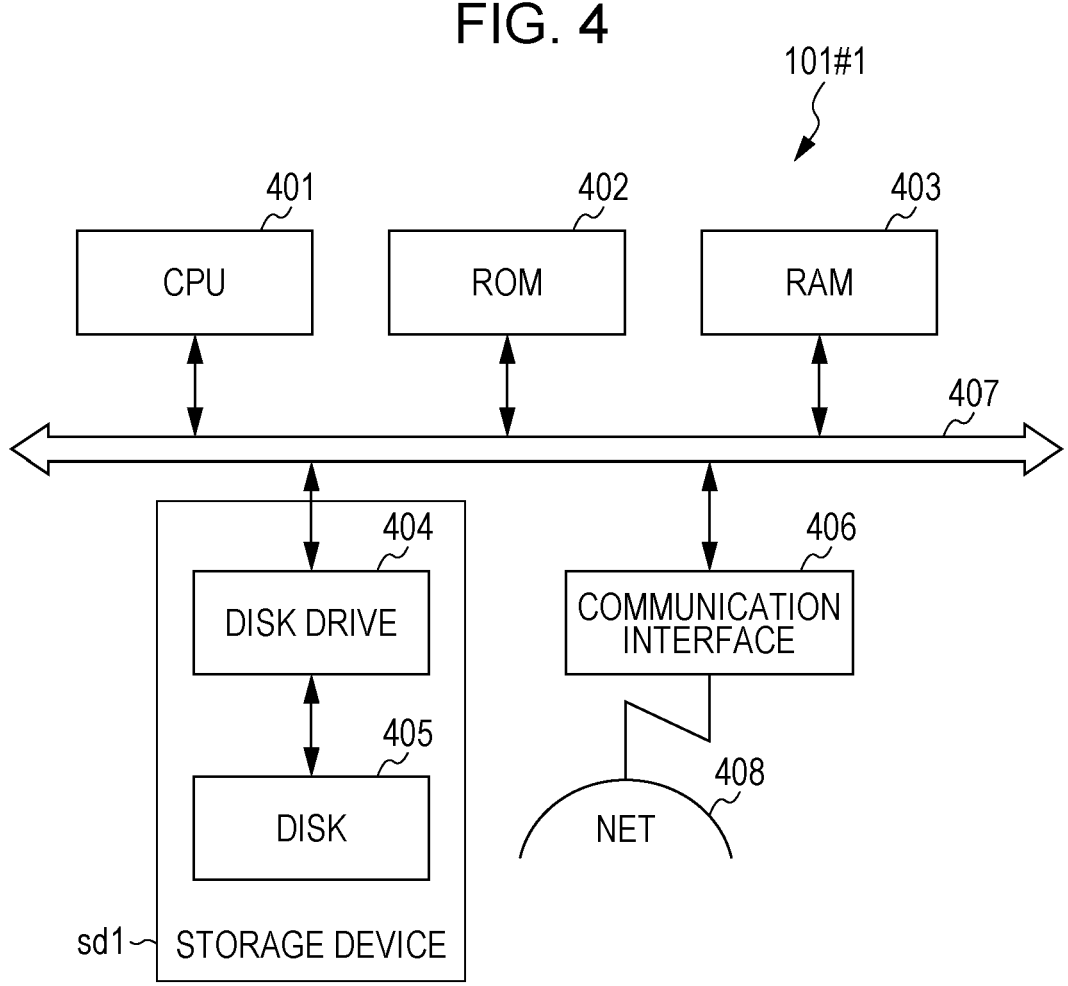

FIG. 5

| DATA NAME | VIRTUAL VOLUME INFORMATION | PHYSICAL VOLUME INFORMATION | |
|---|---|---|---|
| MAPPING TABLE | | | 501 |
| DATA 1_6 | VIRTUAL VOLUME vv1 | PHYSICAL VOLUME pv1 | 501-1 |
| DATA 1_7 | VIRTUAL VOLUME vv1 | PHYSICAL VOLUME pv1 | 501-2 |
| DATA 1_8 | VIRTUAL VOLUME vv1 | PHYSICAL VOLUME pv1 | 501-3 |
| DATA 1_4 | VIRTUAL VOLUME vv1 | PHYSICAL VOLUME pv3 | 501-4 |
| DATA 1_5 | VIRTUAL VOLUME vv1 | PHYSICAL VOLUME pv3 | 501-5 |
| DATA 1_1 | VIRTUAL VOLUME vv1 | PHYSICAL VOLUME pv4 | 501-6 |
| DATA 1_2 | VIRTUAL VOLUME vv1 | PHYSICAL VOLUME pv4 | 501-7 |
| DATA 1_3 | VIRTUAL VOLUME vv1 | PHYSICAL VOLUME pv5 | 501-8 |
| DATA 2_5 | VIRTUAL VOLUME vv2 | STORAGE DEVICE sd1 | 501-9 |
| DATA 2_6 | VIRTUAL VOLUME vv2 | STORAGE DEVICE sd2 | 501-10 |
| DATA 2_3 | VIRTUAL VOLUME vv2 | PHYSICAL VOLUME pv2 | 501-11 |
| DATA 2_4 | VIRTUAL VOLUME vv2 | PHYSICAL VOLUME pv2 | 501-12 |
| DATA 2_2 | VIRTUAL VOLUME vv2 | PHYSICAL VOLUME pv3 | 501-13 |
| DATA 2_1 | VIRTUAL VOLUME vv2 | PHYSICAL VOLUME pv4 | 501-14 |
| DATA 3_3 | VIRTUAL VOLUME vv3 | PHYSICAL VOLUME pv1 | 501-15 |
| DATA 3_2 | VIRTUAL VOLUME vv3 | PHYSICAL VOLUME pv2 | 501-16 |
| DATA 3_1 | VIRTUAL VOLUME vv3 | PHYSICAL VOLUME pv5 | 501-17 |

FIG. 6

| | HIERARCHY INFORMATION | CAPACITY USED [TB] | TOTAL CAPACITY [TB] | QUEUE INFORMATION AND TIMESTAMP INFORMATION | | | VIRTUAL VOLUME INFORMATION | FLAG | SERVER INFORMATION | MIRRORING INFORMATION | |
|---|---|---|---|---|---|---|---|---|---|---|---|
| 601-1 | LEVEL 1 | 0.9 | 1 | DATA 2_5 [TS] | DATA 2_6 [TS] | | VIRTUAL VOLUME vv1 | NOT IN USE | SERVER se1 | MIRRORED | 601-1-1 |
| | | | | | | | VIRTUAL VOLUME vv2 | IN USE | SERVER se1 | MIRRORED | 601-1-2 |
| | | | | | | | VIRTUAL VOLUME vv3 | NOT IN USE | SERVER se2 | NOT MIRRORED | 601-1-3 |
| 601-2 | LEVEL 2 | 10 | 10 | DATA 1_6 [TS] | DATA 3_3 [TS] | DATA 1_7 [TS] | VIRTUAL VOLUME vv1 | IN USE | SERVER se1 | MIRRORED | 601-2-1 |
| | | | | | | DATA 1_8 [TS] | VIRTUAL VOLUME vv2 | NOT IN USE | SERVER se1 | MIRRORED | 601-2-2 |
| | | | | | | | VIRTUAL VOLUME vv3 | IN USE | SERVER se2 | NOT MIRRORED | 601-2-3 |
| 601-3 | LEVEL 3 | 100 | 150 | DATA 2_3 [TS] | DATA 2_4 [TS] | DATA 3_2 [TS] | VIRTUAL VOLUME vv1 | NOT IN USE | SERVER se1 | MIRRORED | 601-3-1 |
| | | | | | | | VIRTUAL VOLUME vv2 | IN USE | SERVER se1 | MIRRORED | 601-3-2 |
| | | | | | | | VIRTUAL VOLUME vv3 | IN USE | SERVER se2 | NOT MIRRORED | 601-3-3 |
| 601-4 | LEVEL 4 | 160 | 200 | DATA 1_4 [TS] | DATA 2_2 [TS] | DATA 1_5 [TS] | VIRTUAL VOLUME vv1 | IN USE | SERVER se1 | MIRRORED | 601-4-1 |
| | | | | | | | VIRTUAL VOLUME vv2 | IN USE | SERVER se1 | MIRRORED | 601-4-2 |
| | | | | | | | VIRTUAL VOLUME vv3 | NOT IN USE | SERVER se2 | NOT MIRRORED | 601-4-3 |
| 601-5 | LEVEL 5 | 300 | 500 | DATA 2_1 [TS] | DATA 1_1 [TS] | DATA 1_2 [TS] | VIRTUAL VOLUME vv1 | IN USE | SERVER se1 | MIRRORED | 601-5-1 |
| | | | | | DATA 3_1 [TS] | DATA 1_3 [TS] | VIRTUAL VOLUME vv2 | IN USE | SERVER se1 | MIRRORED | 601-5-2 |
| | | | | | | | VIRTUAL VOLUME vv3 | IN USE | SERVER se2 | NOT MIRRORED | 601-5-3 |

HIERARCHY INFORMATION TABLE — 601

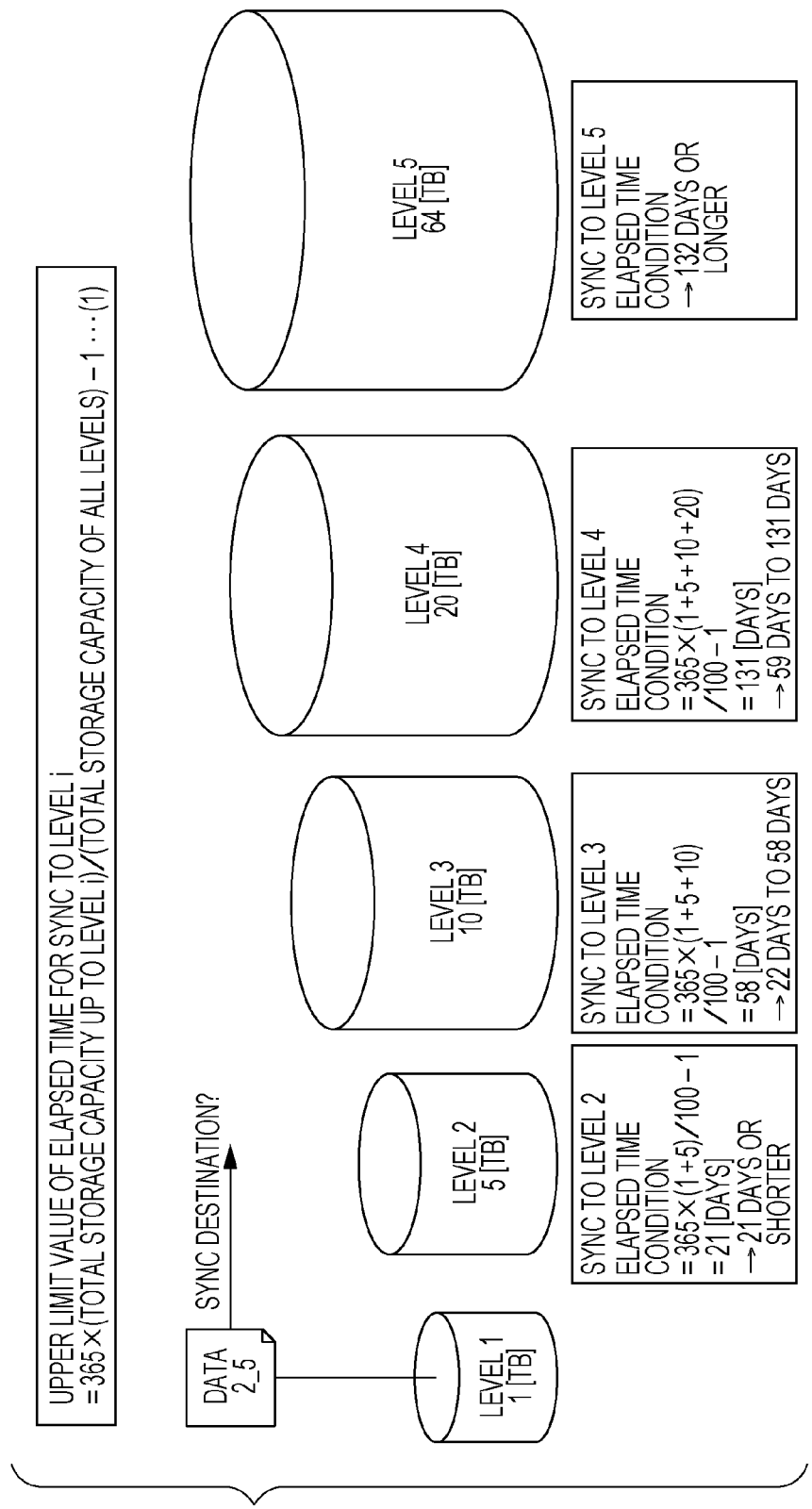

METHOD FOR CONTROLLING STORAGES AND STORAGE CONTROL APPARATUS

CROSS-REFERENCE TO RELATED APPLICATION

This application is based upon and claims the benefit of priority of the prior Japanese Patent Application No. 2012-180210, filed on Aug. 15, 2012, the entire contents of which are incorporated herein by reference.

FIELD

The embodiment discussed herein is related to a method for controlling storages and a storage control apparatus.

BACKGROUND

Currently, there is a technology for controlling a plurality of storages. For example, there is a technology for providing a storage space used for reconstructing a storage disk array when a storage disk has failed. In addition, there is a technology for rearranging pieces of data distributed to a plurality of storages in an environment in which the plurality of storages exist. In addition, there is a technology that includes a first storage for which a high-speed, small-capacity storage apparatus is used and a second storage for which a low-speed, large-capacity storage apparatus is used. In addition, there is a technology for obtaining the variable period of access by continuously accumulating the number of times of access to data in unit time and for moving the data to a storage having appropriate performance among storage levels while referring to the obtained variable period (for example, refer to Japanese Laid-open Patent Publication No. 8-221876, Japanese Laid-open Patent Publication No. 2006-99748, Japanese Laid-open Patent Publication No. 2007-94946, and Japanese Laid-open Patent Publication No. 2003-216460).

However, in the above-described technologies in examples of the related art, there may be a plurality of candidates for a destination of data in a group of storages having three levels or more whose performance for response is different, and therefore it is difficult to move the data while determining a destination storage according to the access frequency, which changes depending on the access condition.

SUMMARY

According to an aspect of the invention, a method, executed by a computer, for controlling storages includes obtaining time elapsed since data to be moved in a source storage in three or more storages whose performance for response to an access request is different is accessed in accordance with the access request, identifying, from the storages, a destination storage that meets condition under which the data to be moved in the source storage is moved, based on the obtained elapsed time by referring to a storage unit that stores the condition under which data is moved to each of the storages, and moving the data to be moved in the source storage to the identified destination storage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a block diagram illustrating an example of the hardware configuration of the storage control apparatus;
FIG. 5 is a diagram illustrating an example of the storage content of a mapping table;
FIG. 6 is a diagram illustrating an example of the storage content of a hierarchy information table;
FIG. 13 is a diagram illustrating an example of the operation of a process for determining a sync destination.

DESCRIPTION OF EMBODIMENT

A method for controlling storages and a storage control apparatus according to an embodiment disclosed herein will be described in detail hereinafter with reference to the accompanying drawings.

Figure 1:
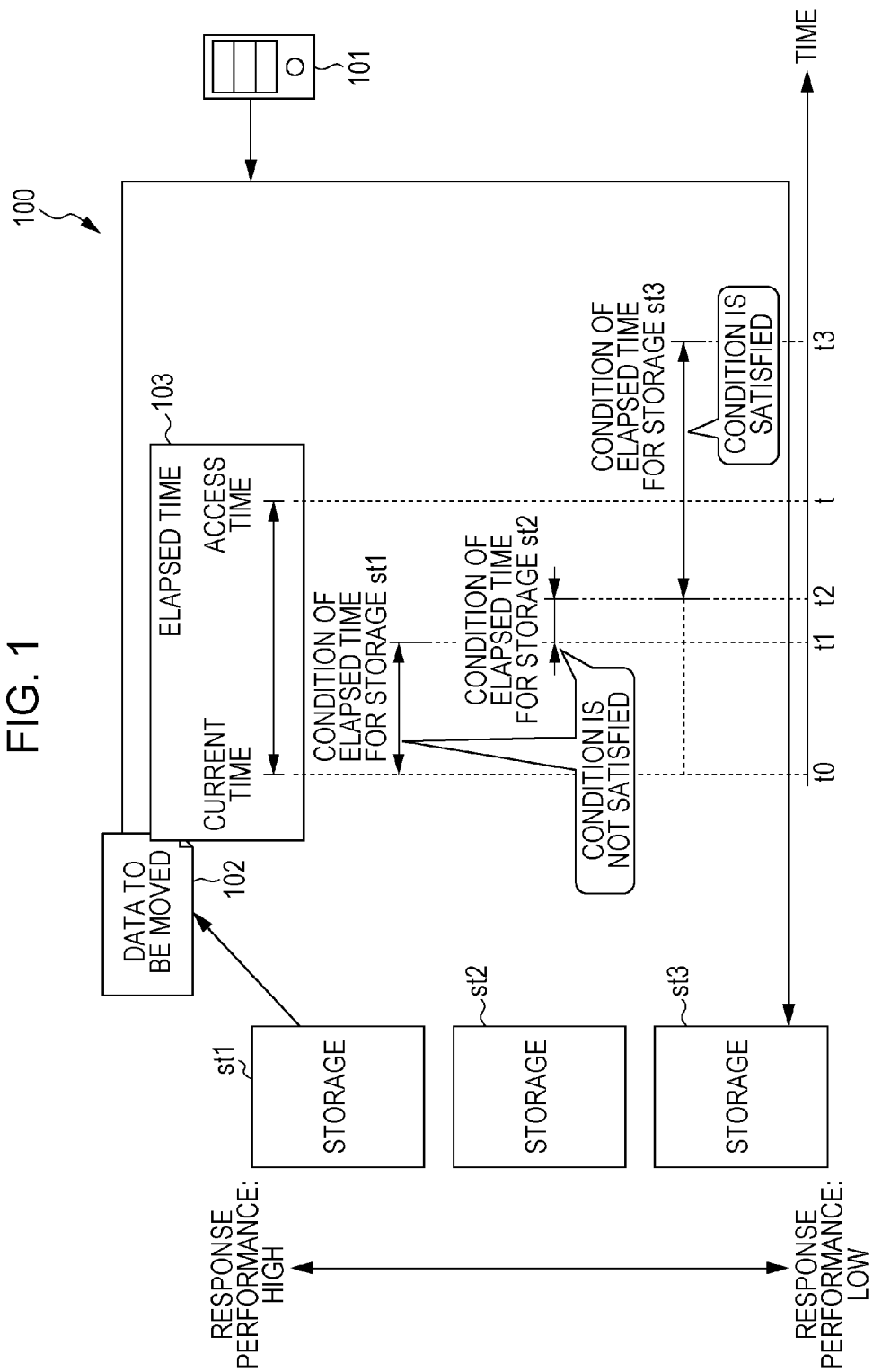
FIG. 1 is a diagram illustrating an example of the operation of a storage control apparatus according to an embodiment.

FIG. 1 is a diagram illustrating an example of the operation of the storage control apparatus according to the present embodiment. A hierarchical storage system 100 includes storages st1 to st3 whose performance for response to an access request is different and a storage control apparatus 101 that controls the storages st1 to st3. The hierarchical storage system 100 is a system that provides the total capacity of the storages st1 to st3 for a user. The storages st1 to st3 are apparatuses that store data. In addition, the storages st1 to st3 include recording media therein and drivers or controllers that control the recording media. Specific differences in performance for response include differences in time taken to respond to an access request between the storages st1 to st3 and whether a storage can perform random access or can perform only sequential access. Even if the time taken to respond to an access request is the same, a storage whose power consumption is low is regarded to have higher performance for response than a storage whose power consumption is high in terms of power efficiency.

With respect to the performance for response of the storages st1 to st3, assume that the performance for response of the storage st1 is the highest, the performance for response of the storage st2 is the second highest, and the performance for response of the storage st3 is the lowest. The storage control apparatus 101 causes a storage to store each piece of data in a data group stored in the hierarchical storage system 100 in accordance with the access frequency of each piece of data, in order to improve the processing performance of the entirety of the hierarchical storage system 100.

When data to be moved 102 stored in the storage st1, which is assumed to be a source storage, has been identified, the storage control apparatus 101 obtains time 103 elapsed since the data to be moved 102 was accessed in accordance with an access request from the user.

The data to be moved 102 is identified when, for example, the elapsed time 103 of the data to be moved 102 is no longer within a range of a time t0 to a time t1, which is a condition of the elapsed time set to the storage st1. The elapsed time 103 is time from the current time t0 to an access time t at which the data to be moved 102 has been accessed for the last time. Alternatively, the data to be moved 102 may be identified when, for example, an available capacity of the storage st1 has become lower than a certain threshold. As a method for identifying the data to be moved 102, for example, the storage control apparatus 101 may identify, in the data stored in the storage st1, a piece of data whose elapsed time since access is the longest as the data to be moved 102.

Next, the storage control apparatus 101 refers to a condition for moving data to each storage set to each storage in order to identify, from the group of storages, a destination storage to which a condition satisfied by the elapsed time 103 is set. The condition is set in accordance with the performance for response of each storage. In the example illustrated in FIG. 1, a condition for moving data to the storage st2 is that the elapsed time of the data is within a range of the time t1 to a time t2, which is shorter than the access time t. A condition for moving data to the storage st3 is that the elapsed time of the data is within a range of the time t2 to a time t3, which is longer than the access time t.

The storage control apparatus 101 refers to the condition for moving data to the storage st2 and the condition for moving data to the storage st3, and identifies, as the destination storage, a storage to which a condition satisfied by the data to be moved 102 is set. The condition for moving data to the storage st2 is that the elapsed time is within a range of the time t1 to the time t2, which is not satisfied by the data to be moved 102. The condition for moving data to the storage st3 is that the elapsed time is within a range of the time t2 to the time t3, which is satisfied by the data to be moved 102. Therefore, the storage control apparatus 101 identifies the storage st3, to which a condition satisfied by the elapsed time 103 is set, as the destination storage.

Next, the storage control apparatus 101 moves the data to be moved 102 from the storage st1, which is the source storage, to the storage st3, which is the identified destination storage. As a specific method for moving data, the storage control apparatus 101 may read the data to be moved 102 from the storage st1 and write the read data to the storage st3.

Alternatively, when the storage st1 has a function of transmitting data to another storage, the storage control apparatus 101 may instruct the storage st1 to transmit the data to be moved 102 to the storage st3.

As described above, the storage control apparatus 101 according to the present embodiment moves data to a higher level as the elapsed time of the data since access becomes shorter. More specifically, the storage control apparatus 101 predicts whether or not the future access frequency of the data to be moved 102 is high using the elapsed time 103. If the elapsed time 103 is short, the storage control apparatus 101 moves the data to be moved 102 to a storage whose performance for response is high, and if the elapsed time 103 is long, the storage control apparatus 101 moves the data to be moved 102 to a storage whose performance for response is low. In doing so, the storage control apparatus 101 may distribute data in accordance with the predicted future access frequency and improve the performance for response to data that is frequently accessed. Details of the storage control apparatus 101 will be described hereinafter with reference to FIGS. 2 to 21.

Figure 2:
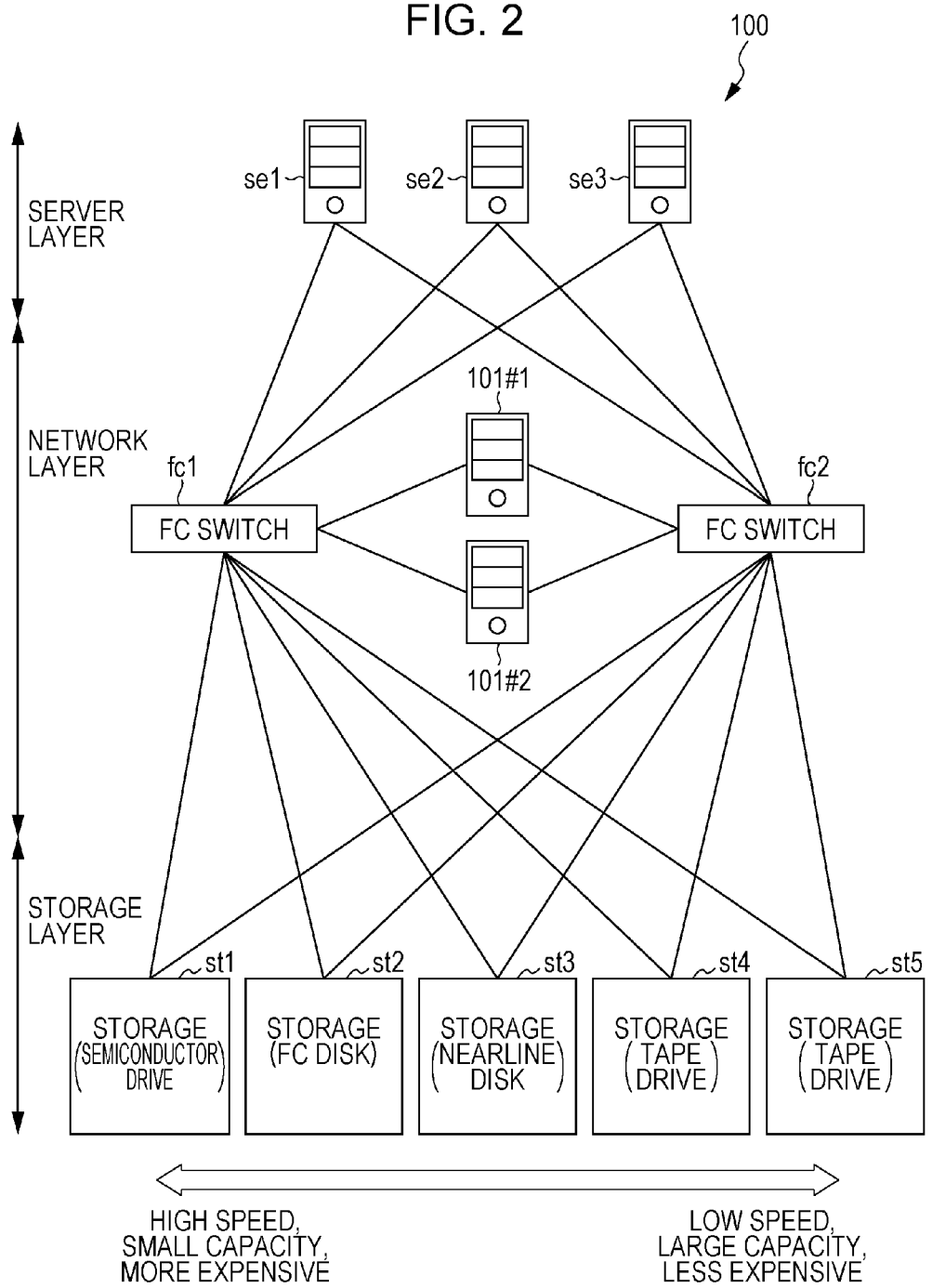
FIG. 2 is a diagram illustrating an example of connection in a hierarchical storage system.

FIG. 2 is a diagram illustrating an example of connection in the hierarchical storage system. In FIG. 2, apparatuses included in the hierarchical storage system 100 will be described. The hierarchical storage system 100 includes storage control apparatuses 101#1 and 101#2, storages st1 to st5, fibre channel (FC) switches fc1 and fc2, and servers se1 to se3.

With respect to the connection relationships between the apparatuses, the server se1 is connected to the FC switches fc1 and fc2. The servers set and se3, too, are connected to the FC switches fc1 and fc2. The storage control apparatus 101#1 is connected to the FC switches fc1 and fc2. The storage control apparatus 101#2, too, is connected to the FC switches fc1 and fc2. The storage st1 is connected to the FC switches fc1 and fc2. The storages st2 to st5, too, are connected to the FC switches fc1 and fc2.

The storage control apparatuses 101#1 and 101#2 are apparatuses that virtualize a group of storages whose performance for response to an access request is different and that provide access to the virtualized storages for the servers se1 to se3. The virtualization of storages is a technology for unifying a plurality of storages and providing the unified storages for the user.

The storages st1 to st5 are apparatuses that store data. More specifically, the storage st1 is a semiconductor drive. The storage st2 is an FC disk. The storage st3 is a nearline disk. The storages st4 and st5 are tape drives. The nearline disk has intermediate performance for response between the FC disk and the tape drives, and may be, for example, a hard disk. With respect to the storages st1 to st5, higher speed, smaller capacity, more expensive storages are illustrated on the left side of FIG. 2, and lower speed, larger capacity, less expensive storages are illustrated on the right side of FIG. 2.

The FC switches fc1 and fc2 are apparatuses that relay communication between the storages st1 to st5 and the servers se1 to se3. The servers se1 to se3 are, for example, apparatuses that perform certain operations, such as web servers or application servers.

In the following description, the hierarchical storage system 100 is divided into three layers, which are a server layer, a network layer, and a storage layer. The server layer includes the servers se1 to se3. The network layer includes the FC switches fc1 and fc2. The storage layer includes the storages st1 to st5.

Figure 3:
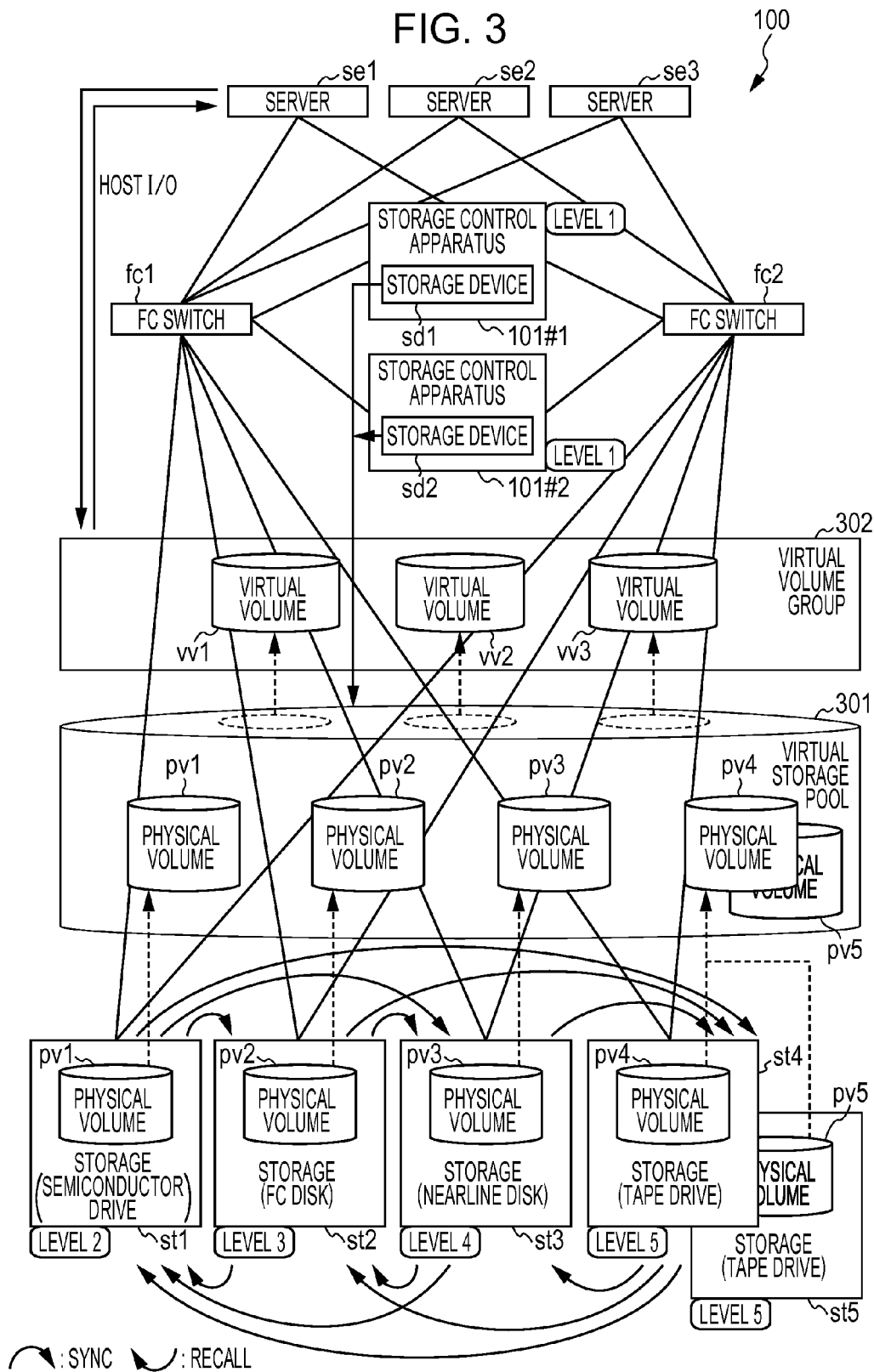
FIG. 3 is a diagram illustrating an example of the software configuration of the hierarchical storage system.

FIG. 3 is a diagram illustrating an example of the software configuration of the hierarchical storage system. The storage control apparatuses 101#1 and 101#2 treat physical volumes pv1 to pv5 included in the storages st1 to st5, respectively, as a single virtual storage pool 301. The storage control apparatuses 101#1 and 101#2 may cause the virtual storage pool 301 to include storage devices sd1 and sd2 therein, respectively. In the present embodiment, it is assumed that disks di1 and dig are included in the virtual storage pool 301. The physical volumes pv1 to pv5 are a series of successive storage regions formatted by an operating system (OS). One storage may include a plurality of volumes.

The storage control apparatuses 101#1 and 101#2 create a virtual volume group 302 from the virtual storage pool 301. In the example illustrated in FIG. 3, the storage control apparatuses 101#1 and 101#2 create virtual volumes vv1 to vv3 from the virtual storage pool 301. The virtual volumes vv1 to vv3 are combinations between the storage devices sd1 and sd2 and the storages st1 to st5.

The storage control apparatuses 101#1 and 101#2 hierarchize and control the storage devices sd1 and sd2 and the storages st1 to st5. More specifically, the storage control apparatuses 101#1 and 101#2 determine the storage devices sd1 and sd2, whose performance for response is the highest, as storages at Level 1. Next, the storage control apparatuses 101#1 and 101#2 determine the storage st1, whose performance for response is the second highest after that of the storage devices sd1 and sd2, as a storage at Level 2. Next, the storage control apparatuses 101#1 and 101#2 determine the storage st2, whose performance for response is the third highest after that of the storage st1, as a storage at Level 3. Next, the storage control apparatuses 101#1 and 101#2 determine the storage st3, whose performance for response is the fourth highest after that of the storage st2, as a storage at Level 4. Next, the storage control apparatuses 101#1 and 101#2 determine the storages st4 and st5, whose performance for response is the lowest, as storages at Level 5.

As specific control performed by the storage control apparatuses 101#1 and 101#2, the storage control apparatuses 101#1 and 101#2 move data stored in a storage at a higher level to a storage at a lower level. To move data to a storage at a lower level will be referred to as "sync" hereinafter. In addition, the storage control apparatuses 101#1 and 101#2 move data stored in a storage at a lower level to a storage at a higher level. To move data to a storage at a higher level will be referred to as "recall" hereinafter. In the following description, a storage at Level n will be simply referred to as "Level n". n is an integer equal to or larger than 1.

For example, when the storage capacity of Level 1 has reached its maximum, the storage control apparatus 101#1 syncs, in data stored in Level 1, a piece of data whose elapsed time since access is the longest to Level 2. When the server se1 has accessed data stored in Level 5, the storage control apparatus 101#1 recalls the accessed data to Level 1.

FIG. 4 is a block diagram illustrating an example of the hardware configuration of the storage control apparatus. In FIG. 4, the storage control apparatus 101#1 includes a central processing unit (CPU) 401, a read-only memory (ROM) 402, and a random-access memory (RAM) 403. In addition, the storage control apparatus 101#1 includes a disk drive 404 and a disk 405 as the storage device sd1, and a communication interface 406. The CPU 401 to the communication interface 406 are connected to one another by a bus 407. Although not illustrated in FIG. 4, the storage control apparatus 101#2 has the same hardware configuration as the storage control apparatus 101#1.

The CPU 401 is an arithmetic processing device that controls the entirety of the storage control apparatus 101#1. The ROM 402 is a non-volatile memory that stores programs such as a boot program. The RAM 403 is a non-volatile memory used as a work area of the CPU 401 and stores tables mentioned below.

The disk drive 404 is a control device that controls reading and writing of data from and to the disk 405 in accordance with the control performed by the CPU 401. As the disk drive 404, for example, a magnetic disk drive, a solid-state drive, or the like may be adopted. The disk 405 is a non-volatile memory that stores the data written as a result of the control performed by the disk drive 404. For example, when the disk drive 404 is a magnetic disk drive, a magnetic disk may be adopted as the disk 405. When the disk drive 404 is a solid-state drive, a semiconductor device memory may be adopted as the disk 405.

The communication interface 406 is a control device that serves as an interface between a network 408 and the inside of the storage control apparatus 101#1 and that controls input and output of data from and to another apparatus. More specifically, the communication interface 406 is connected to a local area network (LAN), a wide area network (WAN), the Internet, or the like, which serves as the network 408, through a communication line, and connected to another apparatus through the network 408. As the communication interface 406, for example, a modem or a LAN adapter may be adopted. The storage control apparatus 101#1 may further include an optical disk drive, an optical disk, a keyboard, and a mouse.

Next, examples of the storage content of tables accessible to the storage control apparatuses 101#1 and 101#2 will be described with reference to FIGS. 5 to 9. With respect to the storage content of each table, the storage control apparatuses 101#1 and 101#2 may include tables having the same storage content, or either the storage control apparatus 101#1 or 101#2 may include the table.

FIG. 5 is a diagram illustrating an example of the storage content of a mapping table. A mapping table 501 is a table that associates virtual volumes and physical volumes with each other. The mapping table 501 illustrated in FIG. 5 stores records 501-1 to 501-17. The mapping table 501 includes three fields, namely data name, virtual volume information, and physical volume information. The data name field stores the name of data to be associated. The virtual volume information field stores identification information regarding a virtual volume that stores corresponding data. The physical volume information field stores identification information regarding a physical volume that actually stores corresponding data.

For example, the record 501-1 indicates that data 1_6 stored in the virtual volume vv1 is stored in the physical volume pv1. In the following description, it is assumed that data 1_1 to 1_8 is data stored in the virtual volume vv1. Similarly, data 2_1 to 2_6 is data stored in the virtual volume vv2, and data 3_1 to 3_3 is data stored in the virtual volume vv3.

FIG. 6 is a diagram illustrating an example of the storage content of a hierarchy information table. A hierarchy information table 601 is a table that stores information regarding each level. The hierarchy information table 601 illustrated in FIG. 6 stores records 601-1 to 601-5. Furthermore, the records 601-1 to 601-5 include sub-records. For example, the record 601-1 includes sub-records 601-1-1 to 601-1-3.

The hierarchy information table 601 includes eight fields, namely hierarchy information, capacity used, total capacity, queue information and timestamp information, virtual volume information, flag in use, server information, and mirroring information. The virtual volume information to the mirroring information fields are fields included in the sub-records.

The hierarchy information field stores information for identifying a corresponding level. The capacity used field stores a storage capacity of each level that is being used. The total capacity field stores a maximum storage capacity of a corresponding level.

The queue information and timestamp information field stores a list of identification information regarding data stored in a corresponding level in order of time elapsed since the data was accessed. Furthermore, the queue information and timestamp information field stores timestamp information indicating a time at which the data has been accessed while associating the time with the identification information regarding the data. The timestamp information indicates the time at which the corresponding data has been accessed for the last time. In the example illustrated in FIG. 6, data whose elapsed time since access is longer is stored on the left side, and data whose elapsed time since access is shorter is stored on the right side in the queue information.

The virtual volume information field stores identification information regarding virtual volumes that can use a corresponding level. The flag in use field stores identifiers indicating whether or not a corresponding level is used by virtual volumes. For example, when a corresponding level is used by a virtual volume, the flag in use filed stores an "in use" identifier. When a corresponding level is not used by a virtual volume, the flag in use field stores a "not in use" identifier.

The server information field stores a server to which a virtual volume is assigned. The mirroring information field stores an identifier indicating whether or not a virtual volume is mirrored in a storage different from a storage corresponding to each level. For example, when a corresponding virtual volume is mirrored in another storage, the mirroring information field stores a "mirrored" identifier. When a corresponding virtual volume is not mirrored in another storage, the mirroring information field stores a "not mirrored" identifier.

For example, the record 601-1 indicates that Level 1 is using a storage capacity of 0.9 [TB], the maximum storage capacity is 1 [TB], and data 2_5 and data 2_6 are stored. Furthermore, the sub-record 601-1-1 indicates that the virtual volume vv1 is not using Level 1, is assigned to the server se1, and mirrored in a storage different from Level 1. The sub-record 601-1-2 indicates that the virtual volume vv2 is using Level 1, assigned to the server se1, and mirrored in a storage different from Level 1. The sub-record 601-1-3 indicates that the virtual volume vv3 is not using Level 1, is assigned to the server set, and not mirrored.

The highest level of each virtual volume will be referred to as a "primary level". For example, the primary level of the virtual volume vv1 is Level 2. The primary level of the virtual volume vv2 is Level 1. Similarly, the primary level of the virtual volume vv3 is Level 2. The primary level of each virtual volume may be stored in the storage regions of the storage control apparatuses 101#1 and 101#2, or may be identified by referring to the flag in use when the primary level of each virtual volume is to be obtained.

Figure 7:
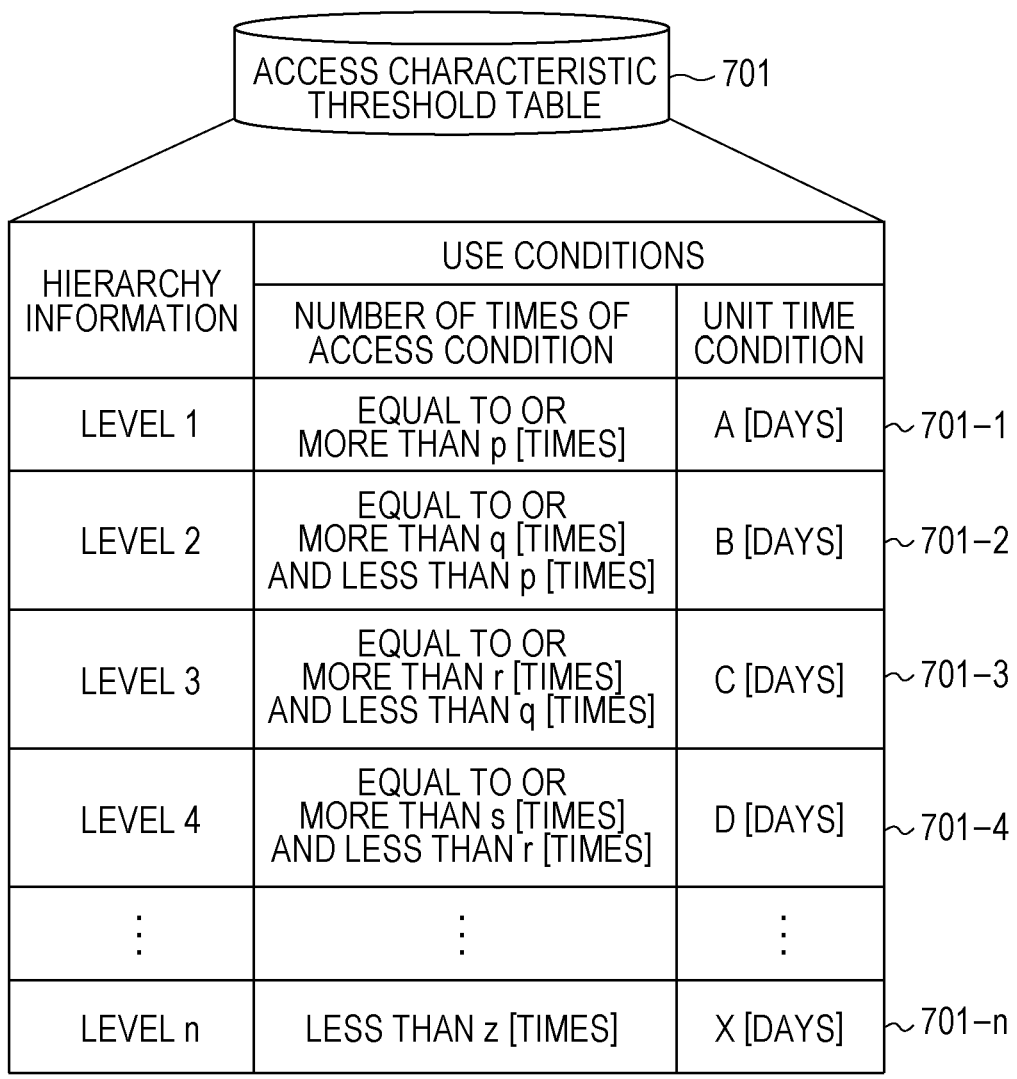
FIG. 7 is a diagram illustrating an example of the storage content of an access characteristic threshold table.

FIG. 7 is a diagram illustrating an example of the storage content of an access characteristic threshold table. An access characteristic threshold table 701 stores, for each level, a condition of the number of access requests in unit time under which each storage is set to a particular level. The particular level refers to a level that is not used by the virtual volumes, and the access characteristic threshold table 701 stores a condition under which each level is not used by the virtual volumes. Alternatively, the access characteristic threshold table 701 may store, for each storage, a condition under which each level is used by the virtual volumes. In the present embodiment, it is assumed that the access characteristic threshold table 701 stores a condition under which each level is used.

In addition, the access characteristic threshold table 701 may store, for each storage, a condition of the number of periods that satisfy the number of access requests in unit time in a given period of time under which each storage is set to a particular level.

The access characteristic threshold table 701 illustrated in FIG. 7 stores records 701-1 to 701-n. The access characteristic threshold table 701 includes two fields, namely hierarchy information and use conditions. The hierarchy information field stores information for identifying a level. The use conditions field stores conditions under which a corresponding level is used. Furthermore, the use conditions field includes two subfields, namely the number of times of access condition and unit time condition. The number of times of access subfield stores a condition of the number of access requests in unit time. The unit time condition subfield stores a condition of the number of periods that satisfy the number of access requests in unit time in a given period of time.

For example, the record 701-1 indicates that a condition under which Level 1 is used is that the number of times of access condition is p [times] or more and the number of days in which the number of times of access becomes p [times] or more is A [days] or more.

Figure 8:
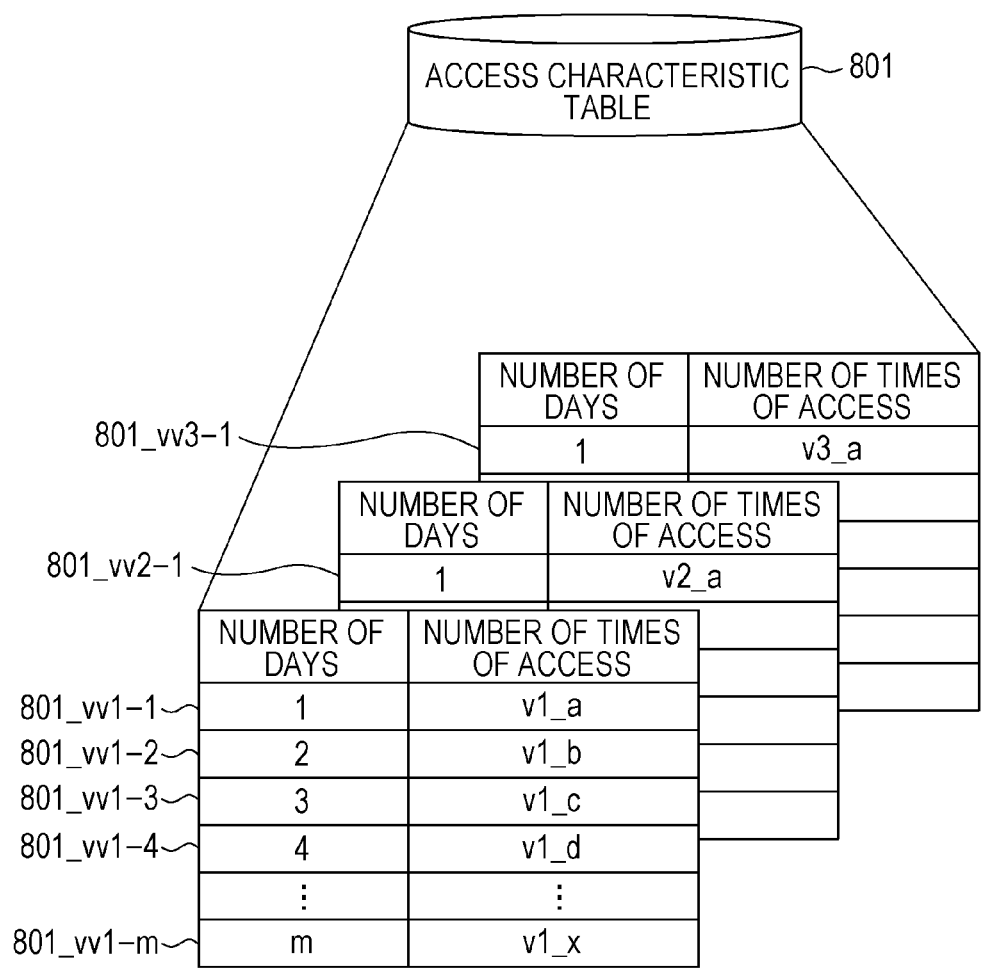
FIG. 8 is a diagram illustrating an example of the storage content of an access characteristic table.

FIG. 8 is a diagram illustrating an example of the storage content of an access characteristic table. An access characteristic table 801 stores, for each virtual volume, the number of access requests in unit time. The access characteristic table 801 illustrated in FIG. 8 stores records 801_vv1-1 to 801_vv1-m, 801_vv2-1 to 801_vv2-m, and 801_vv3-1 to 801_vv3-m. m is an integer equal to or larger than 1. The records 801_vv1-1 to 801_vv1-m store the numbers of access requests to the virtual volume vv1. Similarly, the records 801_vv2-1 to 801_vv2-m store the numbers of access requests to the virtual volume vv2, and the records 801_vv3-1 to 801_vv3-m store the numbers of access requests to the virtual volume vv3. The records 801_vv1-1 to 801_vv3-m illustrated in FIG. 8 are an example at a time when the unit time is a day.

The access characteristic table 801 includes two fields, namely the number of days and the number of times of access. The number of days field stores the number of days to be used. The number of times of access field stores the number of times of access in day(s) specified by the number of days stored in the number of days field. For example, the record 801_vv1-1 indicates that the number of access requests to the virtual volume vv1 in a last one day has been via.

Figure 9:
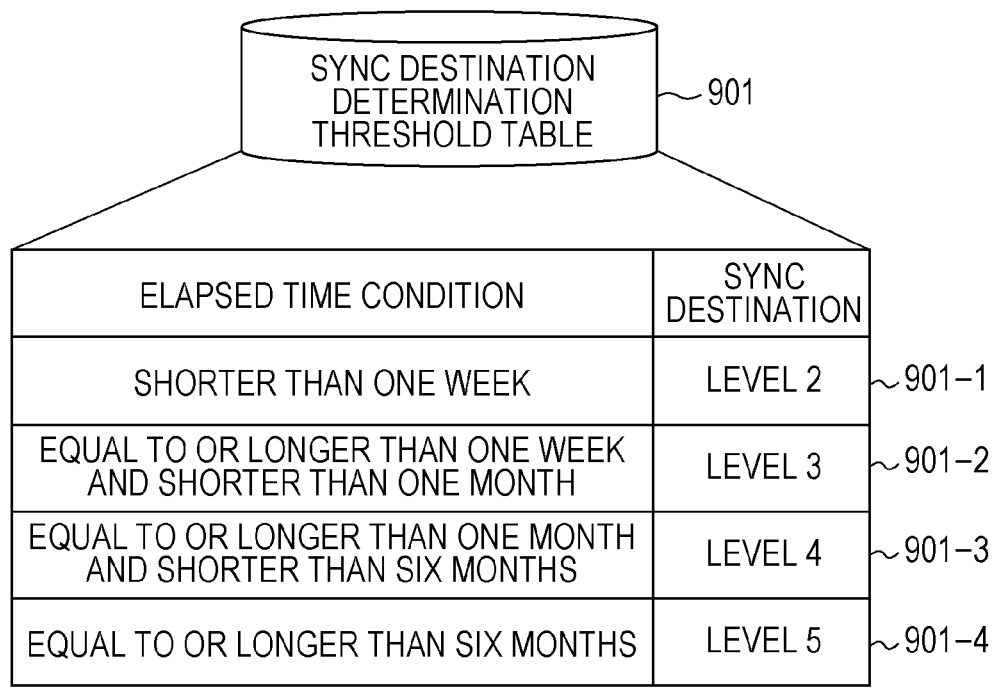
FIG. 9 is a diagram illustrating an example of the storage content of a sync destination determination threshold table.

FIG. 9 is a diagram illustrating an example of the storage content of a sync destination determination threshold table. A sync destination determination table 901 is a table that stores a condition of time elapsed since data to be moved to each level in the group of levels was accessed. The sync destination determination threshold table 901 illustrated in FIG. 9 includes two fields, namely elapsed time condition and sync destination. The elapsed time condition field stores a condition of time elapsed since data to be synced was accessed. The sync destination field stores information for identifying a level to be a sync destination at a time when data to be synced has satisfied the condition stored in the elapsed time condition field.

For example, the record 901-1 indicates that when the time elapsed since data to be synced was accessed is shorter than one week, the sync destination of the data to be synced is determined as Level 2.

Functions of Storage Control Apparatus 101

Figure 10:
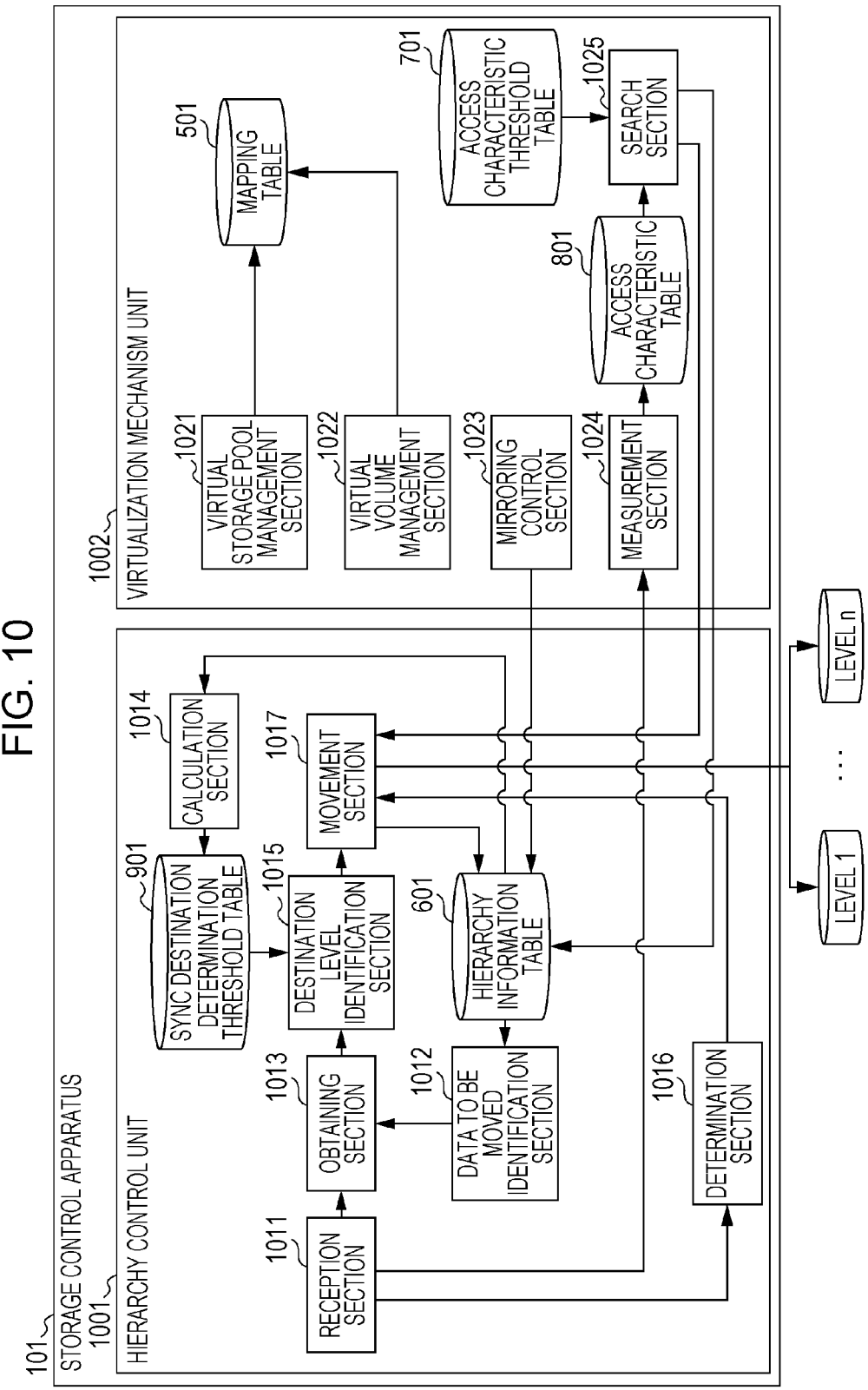
FIG. 10 is a block diagram illustrating an example of the functional configuration of the storage control apparatus.

Next, the functions of the storage control apparatus 101 will be described. FIG. 10 is a block diagram illustrating an example of the functional configuration of the storage control apparatus. The storage control apparatus 101 includes a hierarchy control unit 1001 and a virtualization mechanism unit 1002.

The hierarchy control unit 1001 includes a reception section 1011, a data to be moved identification section 1012, an obtaining section 1013, a calculation section 1014, a destination level identification section 1015, a determination section 1016, and a movement section 1017. The hierarchy control unit 1001 can access the hierarchy information table 601 and the sync destination determination threshold table 901. The virtualization mechanism unit 1002 includes a virtual storage pool management section 1021, a virtual volume management section 1022, a mirroring control section 1023, a measurement section 1024, and a search section 1025. The virtualization mechanism unit 1002 can access the mapping table 501, the access characteristic threshold table 701, and the access characteristic table 801. The mapping table 501 to the sync destination determination threshold table 901 are stored in a storage device such as the RAM 403 or the disk 405.

The functions of the hierarchy control unit 1001 and the virtualization mechanism unit 1002 are realized by the CPU 401 by executing a program stored in a storage device. More specifically, the storage device is, for example, the ROM 402, the RAM 403, or the disk 405 illustrated in FIG. 4 or the like. Alternatively, the functions of the hierarchy control unit 1001 and the virtualization mechanism unit 1002 may be realized by another CPU by executing the program through the communication interface 406.

The hierarchy control unit 1001 controls Levels 1 to n. Specific functions of the hierarchy control unit 1001 become the functions of the reception section 1011 to the movement section 1017. The virtualization mechanism unit 1002 includes a mechanism for realizing virtualization of storages. Specific functions of the virtualization mechanism unit 1002 become the functions of the virtual storage pool management section 1021 to the search section 1025.

The reception section 1011 receives access requests from servers. The access requests include write requests and read requests. Extracted data is stored in a storage region such as the RAM 403 or the disk 405.

The data to be moved identification section 1012 identifies data to be moved from data stored in a source level. For example, if there is no available space in a storage region at the highest level when data is to be written to the highest level, the data to be moved identification section 1012 identifies, from pieces of data stored in the highest level, a piece of data whose elapsed time since access is the longest as data to be moved. Alternatively, the data to be moved identification section 1012 may store the numbers of times of access of the data stored in the highest level and identify a piece of data whose number of times of access is the smallest as data to be moved. Whether or not a level to which data is to be written is the highest level can be determined by referring to the hierarchy information table 601. Identification information regarding data identified as data to be moved is stored in the storage region such as the RAM 403 or the disk 405.

The obtaining section 1013 obtains the time elapsed since the data to be moved identified by the data to be moved identification section 1012 was accessed in accordance with an access request, the elapsed time being stored in a source level in a group of three or more levels whose performance for response to an access request is different. For example, the obtaining section 1013 obtains the elapsed time of the data 1_6 stored in Level 2. More specifically, the obtaining section 1013 obtains the elapsed time by subtracting time indicated by the timestamp information from the current time. The time indicated by the timestamp information is a time at which the data has been accessed for the last time, but may be, for example, an average of times at which past several times of access have occurred.

Alternatively, the obtaining section 1013 may, after the movement section 1017 moves the data to be moved to other levels different from unused levels in the group of levels, obtain time elapsed since the data to be moved stored in a source level among the other levels was accessed in accordance with an access request. For example, among Levels 2, 4, and 5, after the movement section 1017 moves data stored in Level 2 to Levels 4 and 5, which are different from Level 2 that has become an unused level, the obtaining section 1013 obtains the elapsed time of the data 1_4 stored in Level 4. Extracted data is stored in the storage region such as the RAM 403 or the disk 405.

The calculation section 1014 calculates the range of elapsed time that serves as a condition set to each level on the basis of the performance for response of each level such that the upper limit value or the lower limit value of the range of elapsed time that serves as a condition becomes smaller as the performance for response of each level becomes higher. For example, the calculation section 1014 may calculate the lower limit value of the elapsed time of Level i as (i−2)×30 [days]. Adopting this calculation expression, the calculation section 1014 calculates the lower limit value of Level 2 as (2−2)×30=0 [days] and the lower limit value of Level 3 as (3−2)×30=30 [days]. Parts of the ranges of elapsed time may overlap between a higher level and a lower level.

Alternatively, the calculation section 1014 may calculate the range of elapsed time that serves as a condition set to each level on the basis of the storage capacity of each level such that the range of elapsed time that serves as a condition becomes larger as the storage capacity of each level becomes larger. The storage of each level may be an available capacity of each level or may be the maximum storage capacity of each level. For example, the calculation section 1014 may determine the upper limit value of the elapsed time of Level i as (storage capacity of Level i/1 [TB])×10 [days]. For example, when the maximum storage capacity of Level 2 is 10 [TB], the calculation section 1014 calculates the upper limit value of the elapsed time of Level 2 as (10/1)×10=100 [days].

Alternatively, the calculation section 1014 may calculate the range of elapsed time that serves as a condition set to each level on the basis of the storage capacity of each level such that the range of elapsed time that serves as a condition becomes larger as the storage capacity of each level becomes larger. A specific calculation method will be described later with reference to FIG. 13. Calculated data is stored in the storage region such as the RAM 403 or the disk 405.

Furthermore, the calculation section 1014 sets the calculated range of elapsed time that serves as a condition to each level and stores the calculated range in the sync destination determination threshold table 901. For example, the calculation section 1014 stores an upper limit value of 100 [days] and a lower limit value of 0 [days] of the elapsed time of Level 2 in the record 901-1.

The destination level identification section 1015 refers to the sync destination determination threshold table 901 and identifies a destination level to which a condition satisfied by data to be moved is set from the group of levels on the basis of the elapsed time obtained by the obtaining section 1013. For example, assume that the elapsed time obtained by the obtaining section 1013 is 10 [days]. At this time, the destination level identification section 1015 refers to the sync destination determination threshold table 901 illustrated in FIG. 9 and identifies Level 3 as the destination level.

Alternatively, the destination level identification section 1015 may refer to the sync destination determination threshold table 901 and identify a destination level to which a condition satisfied by data to be moved is set among other levels different from unused levels in the group of levels on the basis of the obtained elapsed time. For example, the destination level identification section 1015 identifies, among Levels 2, 4, and 5, a destination level to which a condition satisfied by data to be moved is set from Levels 4 and 5, which are different from Level 2 that has become an unused level. Identification information regarding the identified level is stored in the storage region such as the RAM 403 or the disk 405.

After the reception section 1011 receives an access request and data to be moved is moved, the determination section 1016 determines whether or not the number of access requests in a given period of time is equal to or larger than a certain value. For example, the determination section 1016 determines whether or not there have been, as the certain value, two or more access requests within, as the given period of time, twenty-four hours. A result of the determination is stored in the storage region such as the RAM 403 or the disk 405.

The movement section 1017 moves data to be moved from a source level to the destination level identified by the destination level identification section 1015. For example, the movement section 1017 moves data to be moved from Level 2 that has become a source level to Level 3 that has become a destination level.

Alternatively, the movement section 1017 may move data stored in an unused level in the group of levels to other levels different from unused levels in the group of levels. Alternatively, when an unused level has been found by the search section 1025, the movement section 1017 may move data stored in the unused level to other levels. For example, assume that, among Levels 2, 4, and 5, the search section 1025 has found Level 2 as an unused level. In this case, the movement section 1017 moves data stored in Level 2 to Levels 4 and 5.

In addition, if the determination section 1016 determines that the number of times of access in the given period of time is equal to or larger than the certain value, the movement section 1017 moves data for which access requests have been issued from a level storing the data to a level whose performance for response is higher than that of the level storing the data. For example, assume that the determination section 1016 determines that there have been two or more access requests within twenty-four hours. In this case, the movement section 1017 moves data for which the access requests have been issued from Level 3, which stores the data, to Level 2, whose performance for response is higher than that of Level 3.

The virtual storage pool management section 1021 stores information regarding each physical volume stored in the virtual storage pool 301. More specifically, the virtual storage pool management section 1021 stores the value of the logical unit number (LUN) of a stored physical volume and a world wide port name (WWPN) and a world wide node name (WWNN) as information regarding paths to the storages st1 to st5.

The virtual volume management section 1022 manages associations between the virtual volumes and the physical volumes using the mapping table 501. The mirroring control section 1023 performs mirroring control on the virtual volumes.

The measurement section 1024 measures the number of access requests received by the reception section 1011 in unit time. The measurement section 1024 also measures the number of access requests in a given period of time in unit time. For example, the measurement section 1024 measures the number of access requests in, as the given period of time, 365 days in units of one day. The number of access requests in unit time is stored in a storage region such as the access characteristic table 801.

The search section 1025 refers to the conditions of the number of access requests stored in the access characteristic threshold table 701 and searches the group of levels for an unused level to which a condition satisfied by the number of access requests measured by the measurement section 1024 is set.

Alternatively, the search section 1025 may refer to the conditions of the number of periods that satisfy the number of access requests stored in the access characteristic threshold table 701 and searches the group of levels for an unused level to which a condition satisfied by the number of periods that satisfy the number of access requests measured by the measurement section 1024 is set. A result of the search is stored in the storage region such as the RAM 403 or the disk 405.

Figure 11:
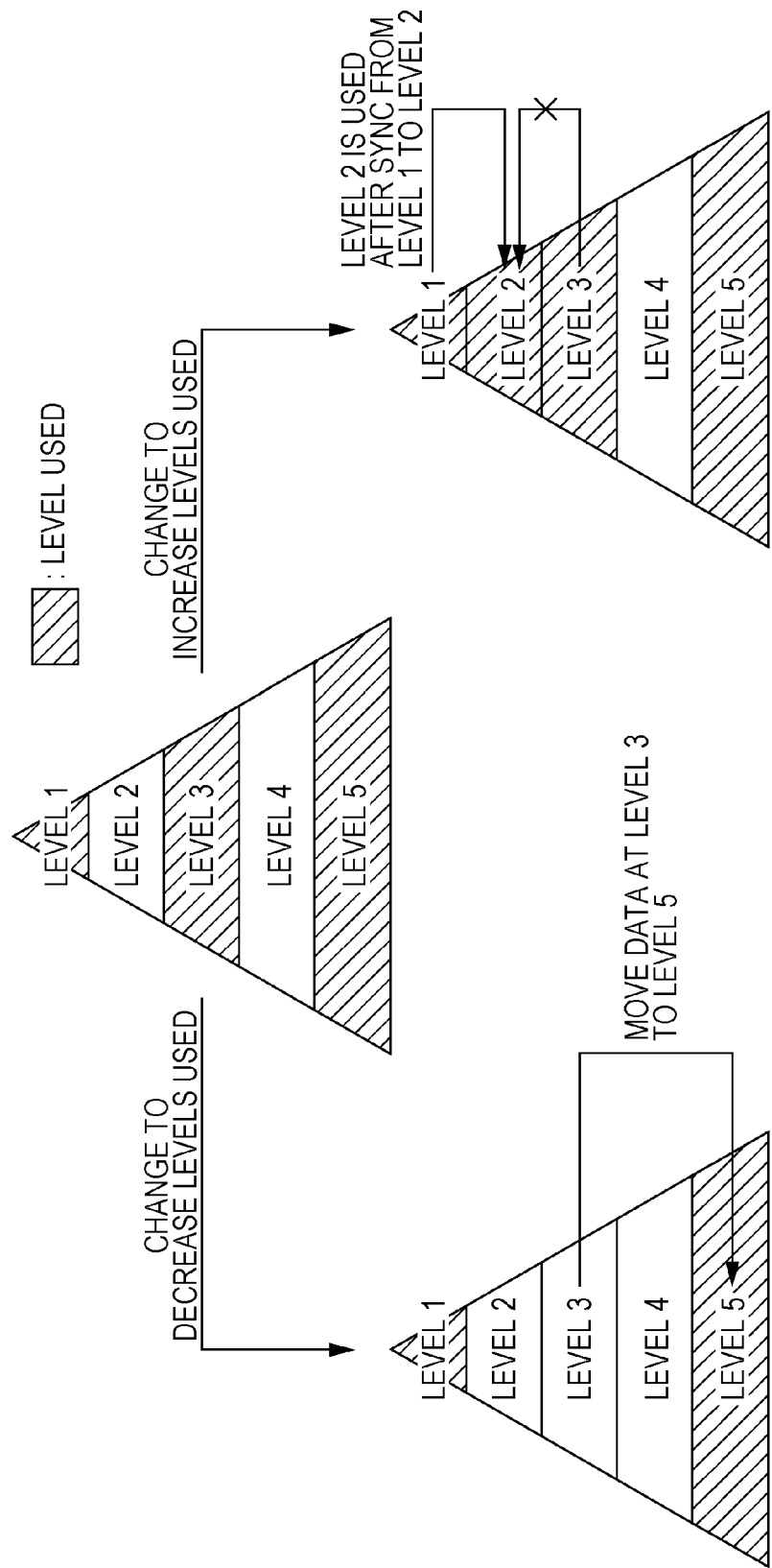
FIG. 11 is a diagram illustrating an example of the hierarchy setting of virtual volumes.

FIG. 11 is a diagram illustrating an example of the hierarchy setting of a virtual volume. The hierarchy setting of a virtual volume may be manually performed by the user or may be automatically performed by selecting all the levels and executing a process for selecting levels to be used on the basis of the access frequency. In FIG. 11, it is assumed that Levels 1, 3, and 5 are specified as levels to be used, and a case in which a change to decrease the levels to be used is made and a case in which a change to increase the levels to be used is made by the manual setting or the automatic setting will be described.

With respect to the change to decrease the levels to be used, an example in which Level 3 is set as an unused level will be described in the example illustrated in FIG. 11. When Level 3 has been set as an unused level, the storage control apparatus 101 moves data stored in the level set as an unused level to a level lower than the level set as an unused level. However, if the lowest level is set as an unused level, the storage control apparatus 101 moves data in the level set as an unused level to a level higher than the level set as an unused level. After the movement of data, the storage control apparatus 101 updates the mapping table 501 and the hierarchy information table 601.

On the other hand, with respect to the change to increase the levels to be used, an example in which Level 2 is set as a level to be used will be described in the example illustrated in FIG. 11. When Level 2 has been set as a level to be used, that is, when a change to increase the levels to be used has been made, the storage control apparatus 101 does not move data. If data to be synced is identified in the data stored in Level 1, the storage control apparatus 101 might move the data to be synced to Level 2. When the data to be synced has been stored in Level 2, Level 2 is used. Recall from Level 3 to Level 2 is not performed.

When a level has been set as an unused level, data stored in the unused level is assumed to be simply moved to a lower level in the above description. As a method for determining a destination, for example, the storage control apparatus 101 may refer to the time elapsed since the data stored in the unused level was accessed and determine the level to which the data is to be moved. For example, the storage control apparatus 101 may refer to the sync destination determination threshold table 901 for each piece of data stored in the unused level and move each piece of data to a level that satisfies a condition.

Alternatively, the storage control apparatus 101 compares the elapsed time of a piece of data whose elapsed time since access is the longest among pieces of data stored in a higher level with the time elapsed since each piece of data stored in the unused level was accessed. The storage control apparatus 101 then moves, to the higher level, a piece of data whose elapsed time since access is shorter than the elapsed time of the piece of data whose elapsed time is the longest. Next, an example of the process for selecting levels to be used on the basis of the access frequency will be described with reference to FIGS. 12A and 12B.

Figure 12A:
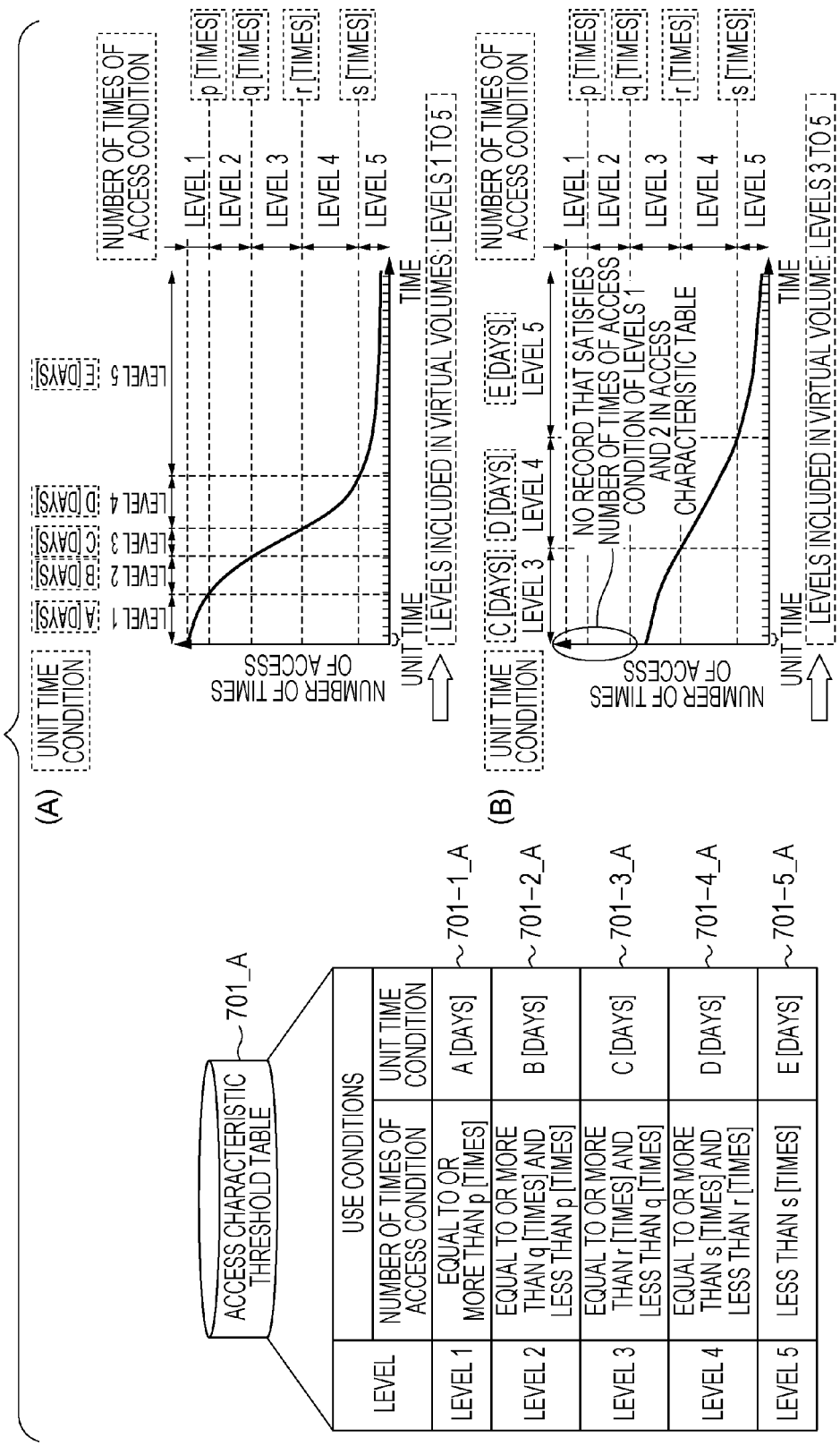
FIG. 12A is a diagram illustrating an example of hierarchy setting based on access frequency.

FIG. 12A is a diagram illustrating an example of hierarchy setting based on the access frequency. In FIG. 12A, an example in which the process for selecting levels to be used is performed in accordance with an access characteristic threshold table 701_A illustrated in FIG. 12A will be described. The access characteristic threshold table 701_A stores records 701-1_A to 701-5_A. The records 701-1_A to 701-4_A are the same storage content as the records 701-1 to 701-4. The record 701-5_A indicates that the number of times of access condition field is less than r [times] and the unit time condition field is E [days] in Level 5.

The (A) part of FIG. 12A illustrates an example in which the number of times of access is large immediately after a virtual volume is created, and gradually decreases thereafter. In the example illustrated in the (A) part of FIG. 12A, since the records in the access characteristic table 801 satisfy all conditions set to Levels 1 to 5 of the access characteristic threshold table 701_A, the storage control apparatus 101 causes the virtual volume to include Levels 1 to 5.

On the other hand, the (B) part of FIG. 12A illustrates an example in which the number of times of access is not large after a virtual volume is created, and gradually decreases over time. In the example illustrated in the (B) part of FIG. 12A, since there is no record that satisfies the conditions of the number of times of access set to Levels 1 and 2 of the access characteristic threshold table 701_A, the storage control apparatus 101 causes the virtual volume to include Levels 3 to 5.

Figure 12B:
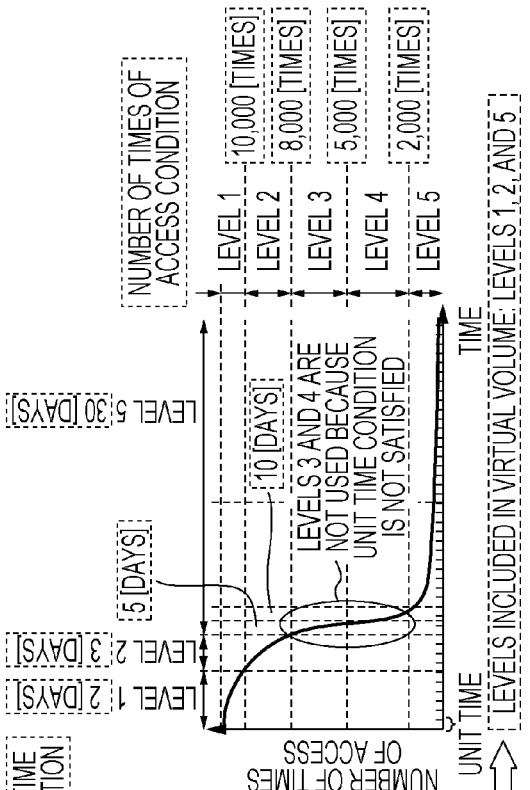
FIG. 12B is a diagram illustrating another example of the hierarchy setting based on the access frequency.

FIG. 12B is a diagram illustrating another example of the hierarchy setting based on the access frequency. In FIG. 12B, an example in which the process for selecting levels to be used is performed in accordance with an access characteristic threshold table 701_B illustrated in FIG. 12B will be described. The access characteristic threshold table 701_B stores records 701-1_B to 701-5_B. In the record 701-1_B, the number of times of access condition field is 10,000 [times] or more and the unit time condition field is 2 [days] in Level 1.

The (C) part of FIG. 12B illustrates an example in which the number of times of access is large immediately after a virtual volume is created, and sharply decreases thereafter. In the example illustrated in the (C) part of FIG. 12B, the records in the access characteristic table 801 satisfy all conditions set to Levels 1 to 5 of the access characteristic threshold table 701_B. However, with respect to Level 3, since the number of days in which the number of times of access is equal to or more than 5,000 [times] and less than 8,000 [times] is smaller than 5 [days], the storage control apparatus 101 sets Level 3 as an unused level. Similarly, with respect to Level 4, since the number of days in which the number of times of access is equal to or more than 2,000 [times] and less than 5,000 [times] is smaller than 10 [days], the storage control apparatus 101 sets Level 4 as an unused level. Therefore, the storage control apparatus 101 causes the virtual volume to include Levels 1, 2, and 5.

FIG. 13 is a diagram illustrating an example of the operation of a process for determining a sync destination. In FIG. 13, an example of a method for determining a level that serves as a sync destination at a time when there is no longer an available region in a higher level will be described. The storage control apparatus 101 refers to the sync destination determination threshold table 901 and determines a level that serves as a sync destination. The sync destination determination threshold table 901 may be set by the user through manual setting, or may be set by the storage control apparatus 101 through automatic setting on the basis of the performance for response of the levels.

When the storage control apparatus 101 is to set conditions, the storage control apparatus 101 calculates the upper limit value of the elapsed time condition using the following expression (1).

$$\text{Upper limit value of elapsed time for sync to Level } i = 365 \times (\text{Total storage capacity up to Level } i) / (\text{Total storage capacity of all levels}) - 1 \quad (1)$$

The lower limit value of the elapsed time condition is a value larger than the upper limit value for a higher level by 1 [day]. The lower limit value of the elapsed time condition set to the highest level is 0. The condition set to the lowest level is satisfied by data whose elapsed time since access is longer than the lower limit value of the elapsed time condition. In the example illustrated in FIG. 13, a case in which the storage control apparatus 101 moves the data 2_5 stored in Level 1 to any of Levels 2 to 5 will be described as an example. Furthermore, in the example illustrated in FIG. 13, it is assumed that a virtual volume storing the data 2_5 is using Levels 2 to 5.

At this time, the storage control apparatus 101 calculates the condition of elapsed time under which the data 2_5 is moved to Levels 2 to 5 in accordance with the expression (1). For example, the storage control apparatus 101 calculates the upper limit value of elapsed time for sync to Level 2 using the expression (1).

$$\text{Upper limit value of elapsed time for sync to Level } 2 = 365 \times (\text{Total storage capacity up to Level } 2) / (\text{Total storage capacity of all levels}) - 1$$

$$\text{Upper limit value of elapsed time for sync to Level } 2 = 365 \times (1+5)/100 - 1 = 21 \text{ [days]}$$

Since Level 2 is the highest level among the levels that can serve as a destination, the storage control apparatus 101 sets the lower limit value of the elapsed time for sync to Level 2 to 0. Therefore, the storage control apparatus 101 sets the elapsed time condition set to Level 2 to 21 days or shorter. Next, the storage control apparatus 101 sets the elapsed time condition set to Level 3 to 22 to 58 days, that set to Level 4 to 59 to 131 days, and that set to Level 5 to 132 days or longer.

In the above-described example, it is assumed that the virtual volume storing the data 2_5 is using Levels 2 to 5. If there is an unused level among Levels 2 to 5, the storage control apparatus 101 calculates the "total storage capacity of all levels" in the expression (1) as the "total storage capacity of levels in use".

As a method for determining whether or not there is an available space, the storage control apparatus 101 may determine that there is no longer an available space in a level set as the primary level when the storage capacity in use exceeds a certain percentage of the maximum storage capacity. The certain percentage may be, for example, half the maximum storage capacity.

Figure 14:
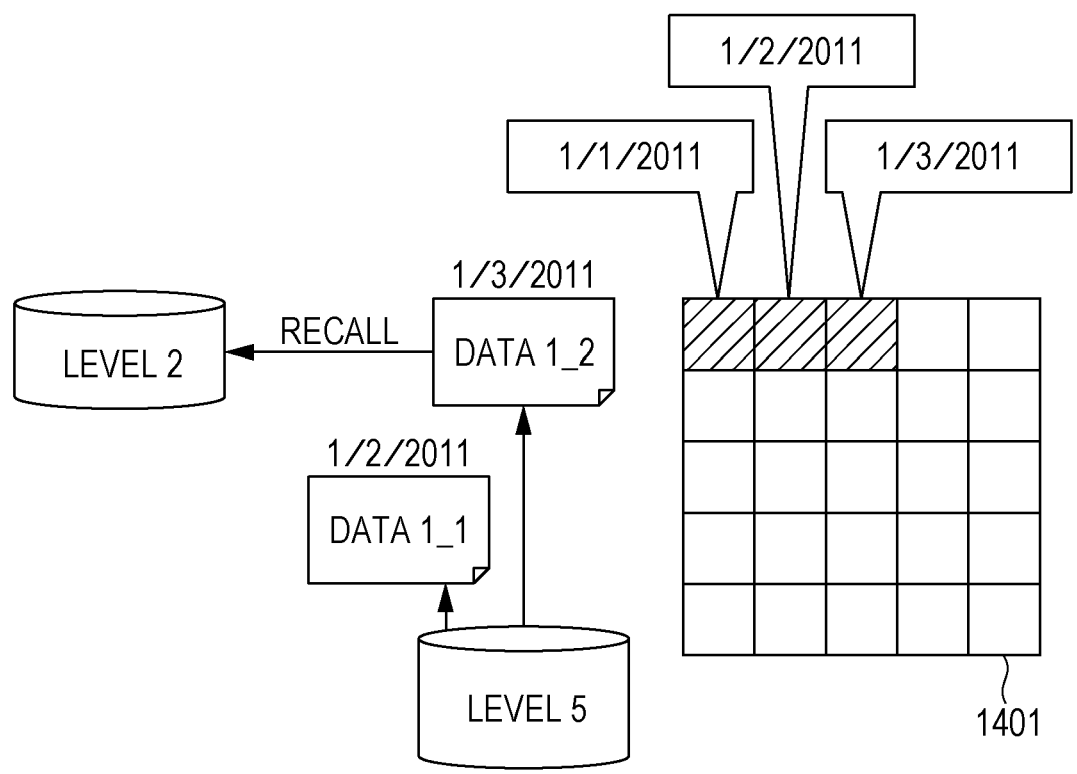
FIG. 14 is a diagram illustrating an example of the operation of a process for controlling recall.

FIG. 14 is a diagram illustrating an example of the operation of a process for controlling recall. In FIG. 14, a process for determining whether or not to perform recall will be described. For example, assume that the server se1 has accessed the data 1_1 stored in Level 5 on Jan. 2, 2011. At this time, the storage control apparatus 101 refers to a recall bitmap 1401 prepared for each server, and if a bit on the day data has been accessed is not set, sets bits on Jan. 2, 2011, on which the data has been accessed, and several days before and after the day. For example, in the example illustrated in FIG. 14, the storage control apparatus 101 sets bits on Jan. 2, 2011 and one day each before and after the day.

Next, assume that the server se1 has accessed the data 1_2 stored in Level 5 on Jan. 3, 2011. At this time, the storage control apparatus 101 refers to the recall bitmap 1401 prepared for each server, and, if a bit on the day data was accessed is set, recalls the accessed data. In the example illustrated in FIG. 14, the storage control apparatus 101 moves the data 1_2 to Level 2.

In addition, the storage control apparatus 101 cancels the setting of a bit a given period of time after setting the bit. As described above, since the storage control apparatus 101 recalls data for a server that frequently issues the access request, the performance for response of the server that is expected to perform a large number of times of access to data is improved. Therefore, the performance of the hierarchical storage system 100 may be improved. In addition, the storage control apparatus 101 may prepare the recall bitmap 1401 for each piece of data, and improve the performance for response to data that is expected to be accessed a large number of times.

Figure 15:
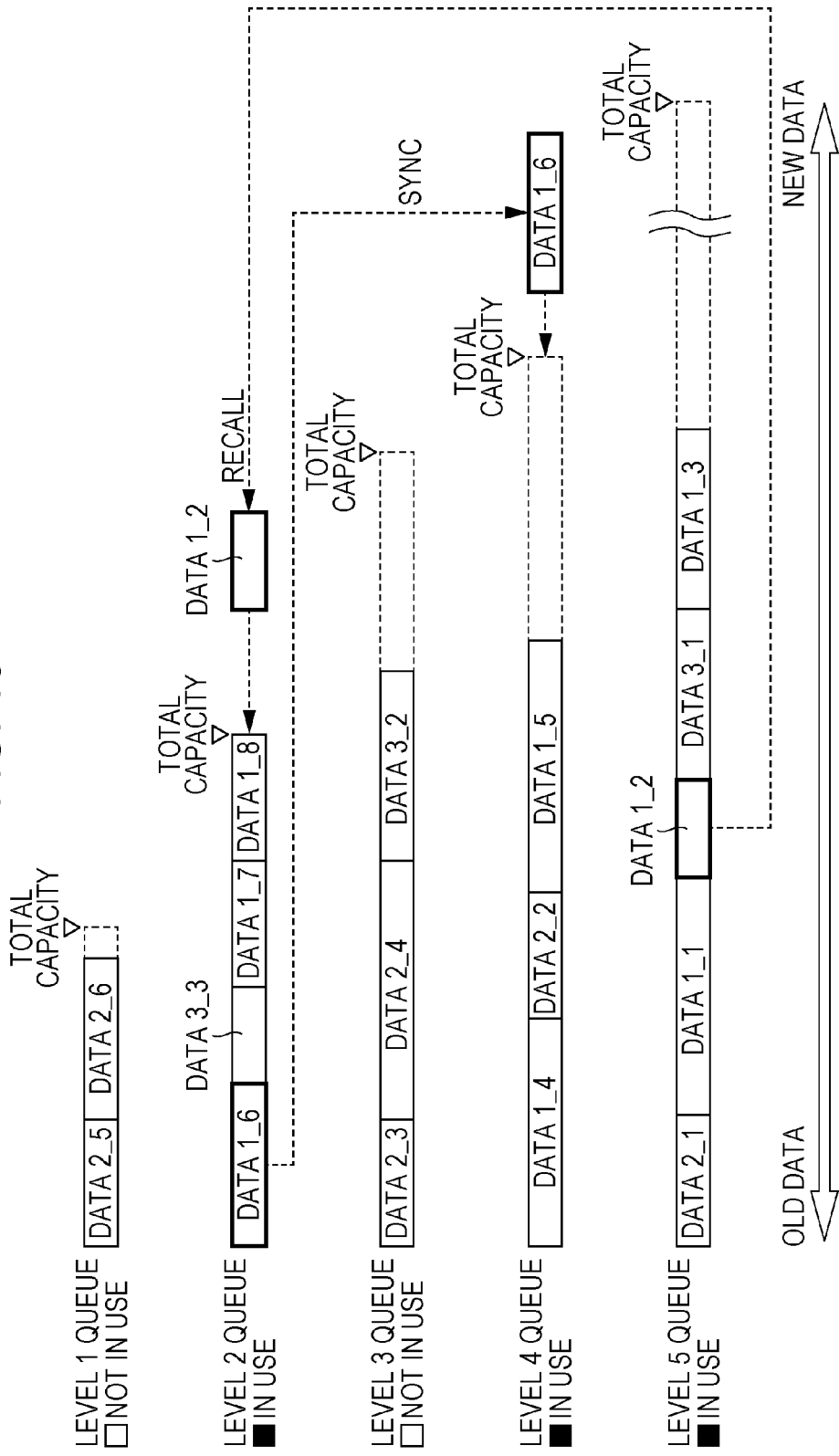
FIG. 15 is a diagram illustrating an example of the operation of a process for controlling a queue.

FIG. 15 is a diagram illustrating an example of the operation of a process for controlling a queue. In FIG. 15, the operation of control of data stored in each level will be described. When data accessed by a server is stored in the primary level, the storage control apparatus 101 performs a process for inputting and outputting (I/O) the data and updates timestamp information regarding the data.

On the other hand, when data accessed by a server is not stored in the primary level, the storage control apparatus 101 performs the process for inputting and outputting the data and updates timestamp information regarding the data. Furthermore, the storage control apparatus 101 recalls the data to the primary level, and stores the data at a trailing end of queue information regarding the primary level.

When there is no available region in the primary level, the storage control apparatus 101 identifies data to be synced from data stored in the primary level, and syncs the data to a lower level. The data to be synced is, for example, a piece of data whose elapsed time since access is the longest in the data stored in the primary level.

A series of processes when data accessed by a server is not stored in the primary level and there is no available region in the primary level will be described hereinafter with reference to FIG. 15. For example, assume that the server se1 has issued an access request for the data 1_2. At this time, the storage control apparatus 101 tries to move the data 1_2 to Level 2, which is the primary level. However, since there is no available region in Level 2, the storage control apparatus 101 identifies the data 1_6, whose elapsed time is the longest in the data stored in Level 2, as data to be synced, and syncs the data 1_6 to Level 4, which is one of the levels used by the server se1. Therefore, a region is secured in Level 2, and the storage control apparatus 101 recalls the data 1_2 to Level 2 and updates the timestamp information.

Because queue information regarding each level is shared by all the virtual volumes, a virtual volume storing the data to be synced and a virtual volume storing data to be recalled might not be the same. For example, when the data whose elapsed time is the longest in the data stored in Level 2 is the data 3_3, the storage control apparatus 101 syncs the data 3_3 to Level 3, which is a lower level used by the virtual volume vv3.

Next, processes executed by the storage control apparatus 101 according to the present embodiment will be described with reference to flowcharts of FIGS. 16 to 21. The processes illustrated in the flowcharts of FIGS. 16 to 21 may be executed by the storage control apparatus 101#1 or the storage control apparatus 101#2. In the following description, it is assumed that the storage control apparatus 101#1 executes the processes.

Figure 16:
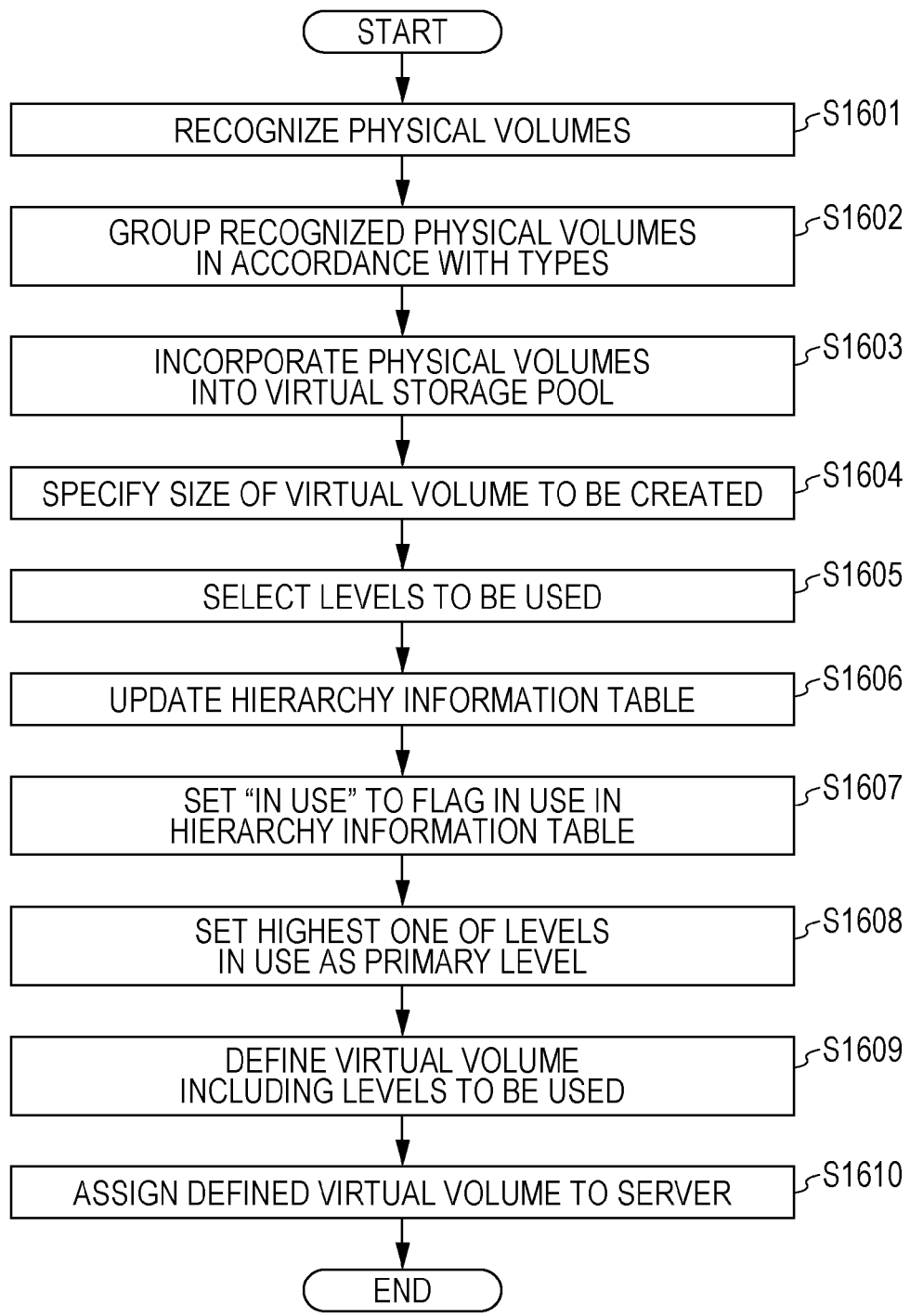
FIG. 16 is a flowchart illustrating an example of the procedure of a process for creating a virtual volume.

FIG. 16 is a flowchart illustrating an example of the procedure of a process for creating a virtual volume. The process for creating a virtual volume is a process for creating a virtual volume from the virtual storage pool 301. First, the storage control apparatus 101#1 recognizes physical volumes (step S1601). Next, the storage control apparatus 101#1 groups the recognized physical volumes in accordance with types (step S1602).

The storage control apparatus 101#1 then incorporates the physical volumes into the virtual storage pool 301 (step S1603). Next, the storage control apparatus 101#1 specifies the size of a virtual volume to be created (step S1604). The storage control apparatus 101#1 then selects levels to be used (step S1605). The selection of the levels to be used may be performed by the user through manual setting, or may be performed by selecting all the levels through automatic setting and by executing a process for selecting levels to be used based on the access frequency illustrated in FIG. 18.

Next, the storage control apparatus 101#1 updates the hierarchy information table 601 (step S1606). As a specific item to be updated, the storage control apparatus 101#1 adds a sub-record regarding the virtual volume to be created to the record regarding each level in the hierarchy information table 601. Next, the storage control apparatus 101#1 sets "in use" to the flag in use in the sub-record regarding the virtual volume to be created in the record regarding each of the levels selected by the processing executed in step S1605 in the hierarchy information table 601 (step S1607). Next, the storage control apparatus 101#1 sets a highest one of the levels in use as a primary level (step S1608).

Next, the storage control apparatus 101#1 defines a virtual volume including the levels to be used (step S1609). In the processing in step S1609, the storage control apparatus 101#1 may adopt thin provisioning and set an actually empty region to the virtual volume to be created. Upon receiving a first write request, the storage control apparatus 101#1 assigns an actual capacity to the virtual volume. Next, the storage control apparatus 101#1 assigns the defined virtual volume to a server (step S1610).

After executing step S1610, the storage control apparatus 101#1 ends the process for creating a virtual volume. By executing the process for creating a virtual volume, the hierarchical storage system 100 may enable a server to access a virtual volume.

Figure 17A:
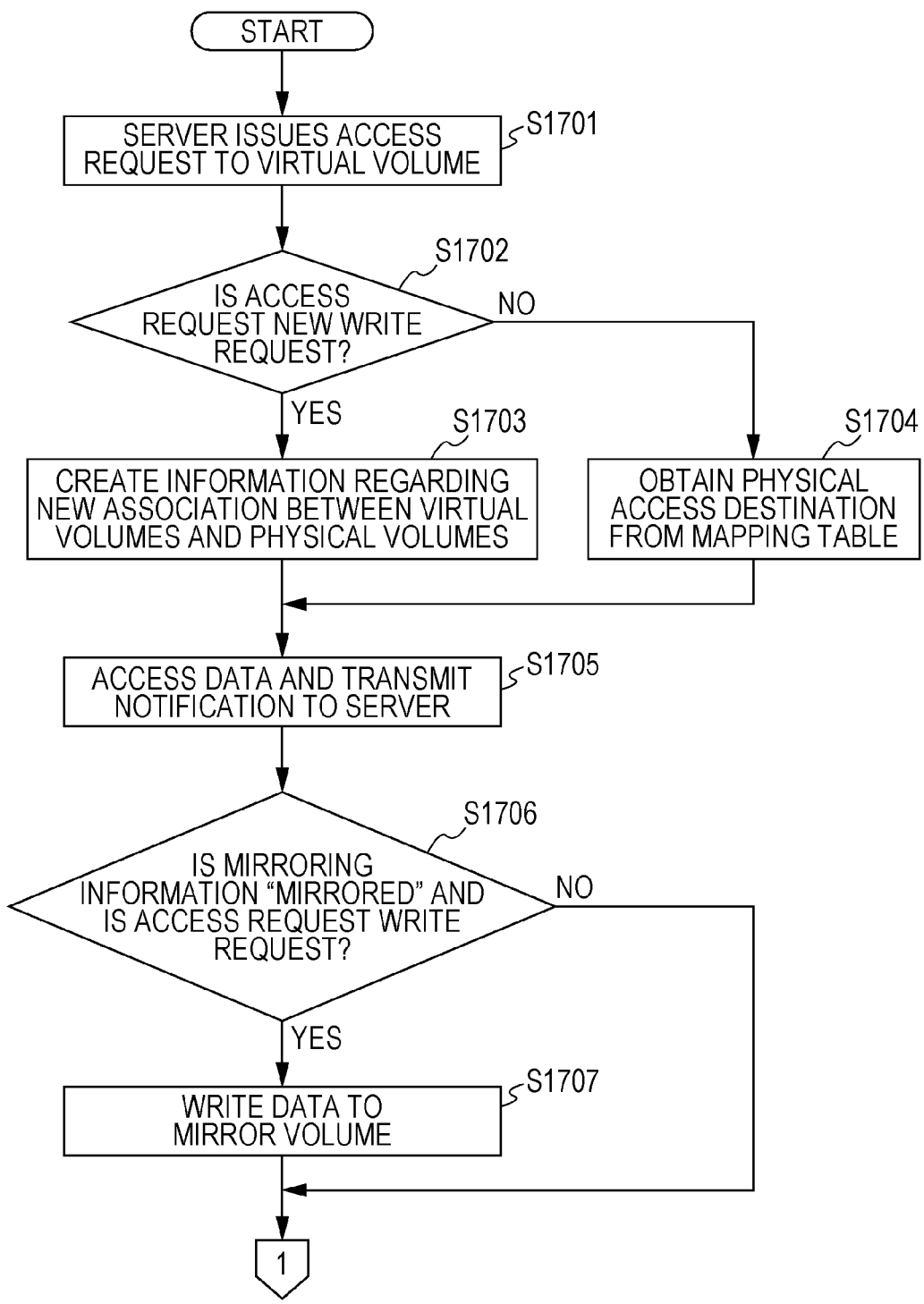
FIG. 17A is a first flowchart illustrating an example of the procedure of a process for accessing a virtual volume.

FIG. 17A is a first flowchart illustrating an example of the procedure of a process for accessing a virtual volume. The process for accessing a virtual volume is a process executed when a server has issued an access request.

A server issues an access request for a virtual volume to the storage control apparatus 101#1 (step S1701). Next, the storage control apparatus 101#1 determines whether or not the access request is a new write request (step S1702). If the access request is a new write request (YES in step S1702), the storage control apparatus 101#1 creates information regarding a new association between virtual volumes and physical volumes in the mapping table 501 (step S1703). If the access request is not a new write request (NO in step S1702), the storage control apparatus 101#1 obtains a physical access destination from the mapping table 501 (step S1704).

After executing step S1703 or S1704, the storage control apparatus 101#1 accesses the data and transmits a notification to the server (step S1705). More specifically, if the access request is a write request, the storage control apparatus 101#1 stores the write request in a cache memory thereof, and transmits a notification about completion of the writing to the server. On the other hand, if the access request is a read request and data for which the access request has been issued is stored in the cache memory, the storage control apparatus 101#1 transmits the stored data to the server. If the access request is a read request and data for which the access request has been issued is not stored in the cache memory, the storage control apparatus 101#1 reads the data from one of the levels and transmits the stored data to the server.

Next, the storage control apparatus 101#1 determines whether or not the mirroring information is "mirrored" and the access request is a write request (step S1706). If results of the determination are positive (YES in step S1706), the storage control apparatus 101#1 writes the data to a mirror volume (step S1707). After completion of step S1707, or if results of the determination in step S1706 are negative (NO in step S1706), the storage control apparatus 101#1 proceeds to processing in step S1708 illustrated in FIG. 17B.

Figure 17B:
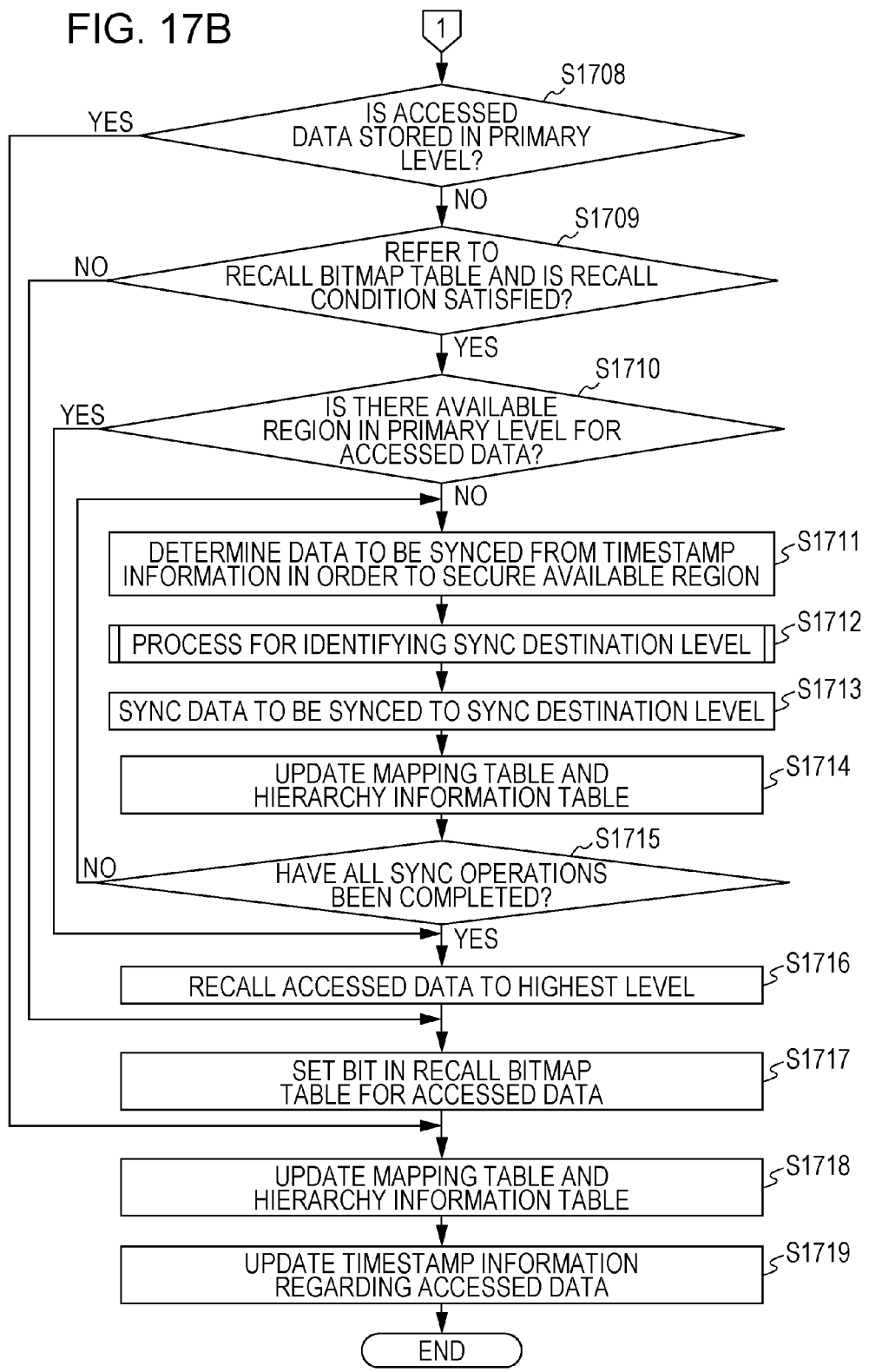
FIG. 17B is a second flowchart illustrating an example of the procedure of the process for accessing a virtual volume.

FIG. 17B is a second flowchart illustrating an example of the procedure of a process for accessing a virtual volume. The storage control apparatus 101#1 determines whether or not the accessed data is stored in the primary level (step S1708). If the accessed data is not stored in the primary level (NO in step S1708), the storage control apparatus 101#1 refers to the recall bitmap 1401 and determines whether or not a recall condition is satisfied (step S1709). If the recall condition is satisfied (YES in step S1709), the storage control apparatus 101#1 determines whether or not there is an available region in the primary level for the accessed data (step S1710).

If there is no available region in the primary level (NO in step S1710), the storage control apparatus 101#1 determines data to be synced from the timestamp information in order to secure an available region (step S1711). Next, the storage control apparatus 101#1 executes a process for identifying a sync destination level (step S1712). Details of the process for identifying a sync destination level will be described later with reference to FIG. 18. Next, the storage control apparatus 101#1 syncs the data to be synced to the sync destination level (step S1713). The storage control apparatus 101#1 then updates the mapping table 501 and the hierarchy information table 601 (step S1714). Next, the storage control apparatus 101#1 determines whether or not all sync operations have been completed (step S1715). If the sync operations have not been completed (NO in step S1715), the storage control apparatus 101#1 proceeds to the processing in step S1711.

If there is an available region in the primary level (YES in step S1710), or if all sync operations have been completed (YES in step S1715), the storage control apparatus 101#1 recalls the accessed data to the highest level (step S1716). With respect to the processing in step S1716, data for the second time and later is assumed to be recalled in the process for accessing a virtual volume illustrated in FIGS. 17A and 17B. If it is desired to recall data for the first time after completing step S1716, the storage control apparatus 101#1 sets a bit in the recall bitmap 1401 by processing in step S1717, and stores a data name. Next, when executing the processing in step S1716, the storage control apparatus 101#1 recalls the accessed data and the data corresponding to the stored data name.

After executing step S1716, or if the recall condition is not satisfied (NO in step S1709), the storage control apparatus 101#1 sets a bit in the recall bitmap 1401 for the accessed data (step S1717). After executing step S1717, or if the accessed data is stored in the primary level (YES in step S1708), the storage control apparatus 101#1 updates the mapping table 501 and the hierarchy information table 601 (step S1718).

Next, the storage control apparatus 101#1 updates the timestamp information regarding the accessed data (step S1719). After executing step S1719, the storage control apparatus 101#1 ends the process for accessing a virtual volume. By executing the process for accessing a virtual volume, the hierarchical storage system 100 may move data to an optimal level in accordance with the access frequency of the data upon receiving an access request.

Figure 18:
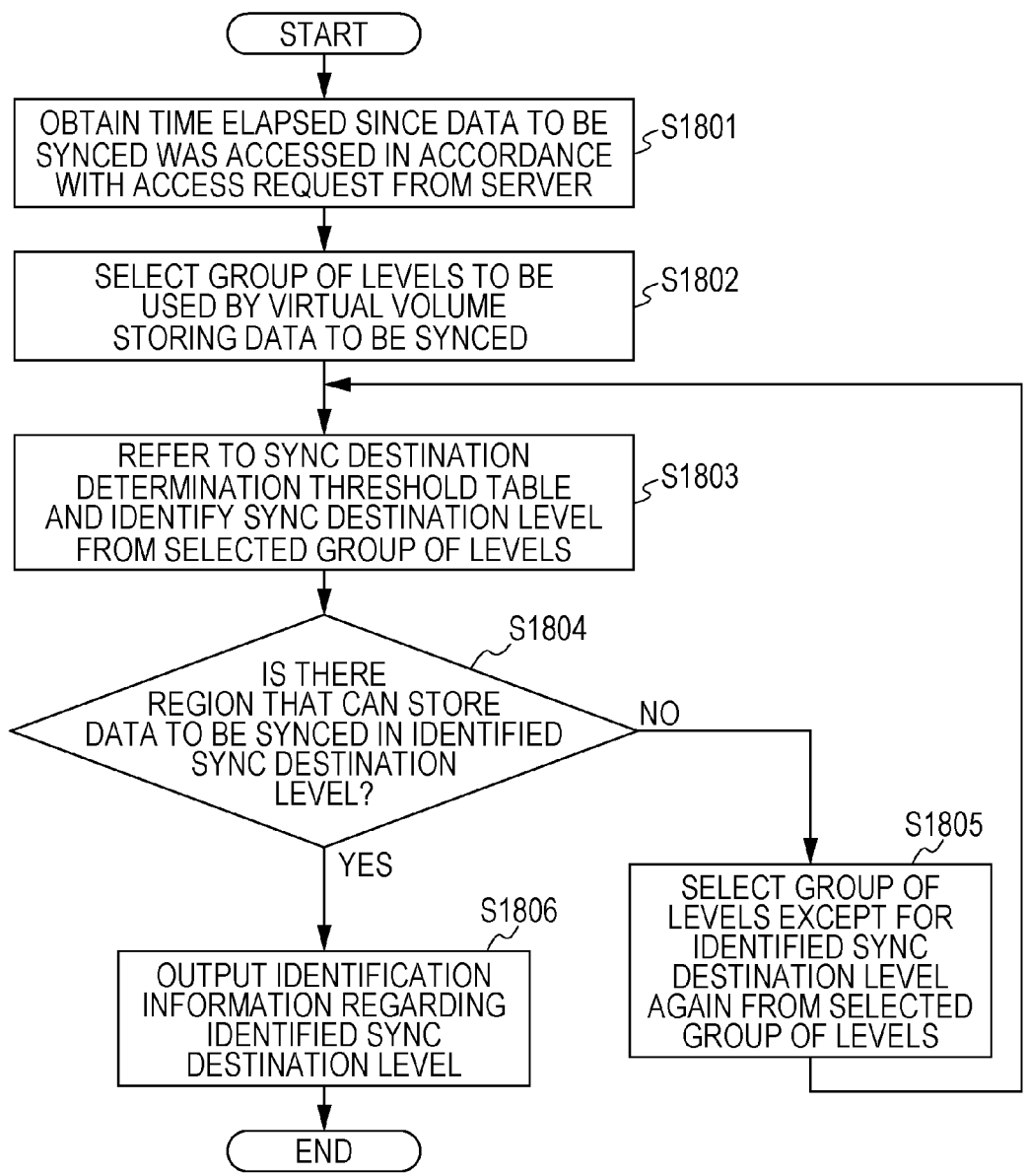
FIG. 18 is a flowchart illustrating an example of a process for identifying a sync destination level.

FIG. 18 is a flowchart illustrating an example of a process for identifying a sync destination level. The process for identifying a sync destination level is a process for identifying a level that serves as a sync destination from a group of levels. The storage control apparatus 101#1 obtains time elapsed since data to be synced was accessed in accordance with an access request from a server (step S1801). Next, the storage control apparatus 101#1 selects a group of levels to be used by a virtual volume storing the data to be synced (step S1802). The storage control apparatus 101#1 then refers to the sync destination determination threshold table 901 and identifies a sync destination level from the selected group of levels (step S1803). Next, the storage control apparatus 101#1 determines whether or not there is a region that can store the data to be synced in the identified sync destination level (step S1804).

If there is no region that can store the data to be synced (NO in step S1804), the storage control apparatus 101#1 selects a group of levels except for the identified sync destination level again from the selected group of levels (step S1805). After executing step S1805, the storage control apparatus 101#1 proceeds to the processing in step S1803. If there is a region that can store the data to be synced (YES in step S1804), the storage control apparatus 101#1 outputs identification information regarding the identified sync destination level (step S1806). After executing step S1806, the storage control apparatus 101#1 ends the process for identifying a sync destination level. By executing the process for identifying a sync destination level, the hierarchical storage system 100 may identify a level according to the access frequency of data.

Figure 19:
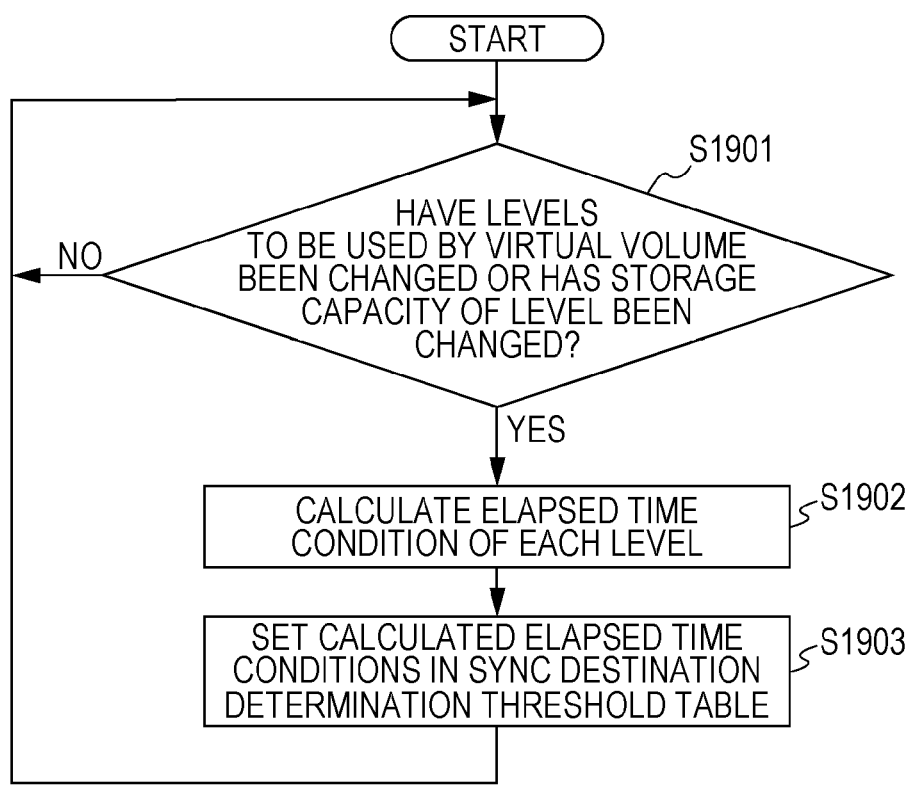
FIG. 19 is a flowchart illustrating an example of a process for updating the sync destination determination threshold table.

FIG. 19 is a flowchart illustrating an example of a process for updating the sync destination determination threshold table. The process for updating the sync destination determination threshold table is a process for updating the elapsed time condition set to each level stored in the sync destination determination threshold table 901.

The storage control apparatus 101#1 determines whether or not the levels to be used by a virtual volume have been changed or the storage capacity of a level has been changed (step S1901). The levels to be used by a virtual volume are changed when, for example, a process for selecting levels to be used illustrated in FIGS. 20 and 21 has been executed or when the user has added or deleted a level to be used. In addition, the storage capacity of a level is changed when, for example, a new physical volume has been added and accordingly the storage capacity of a certain level has been increased.

If the levels to be used by a virtual volume have not been changed and the storage capacity of a level has not been changed (NO in step S1901), the storage control apparatus 101#1 executes the processing in step S1901 again after the lapse of a given period of time.

If the levels to be used by a virtual volume have been changed or the storage capacity of a level has been changed (YES in step S1901), the storage control apparatus 101#1 calculates the elapsed time condition of each level (step S1902). More specifically, the storage control apparatus 101#1 calculates the elapsed time condition of each level using the expression (1). Next, the storage control apparatus 101#1 sets the calculated elapsed time conditions in the sync destination determination threshold table 901 (step S1903). After executing step S1903, the storage control apparatus 101#1 proceeds to the processing in step S1901. By executing the process for updating the sync destination determination threshold table, the storage control apparatus 101#1 may dynamically change the condition under which data is stored in accordance with the use condition and the storage capacity of each level.

Figure 20:
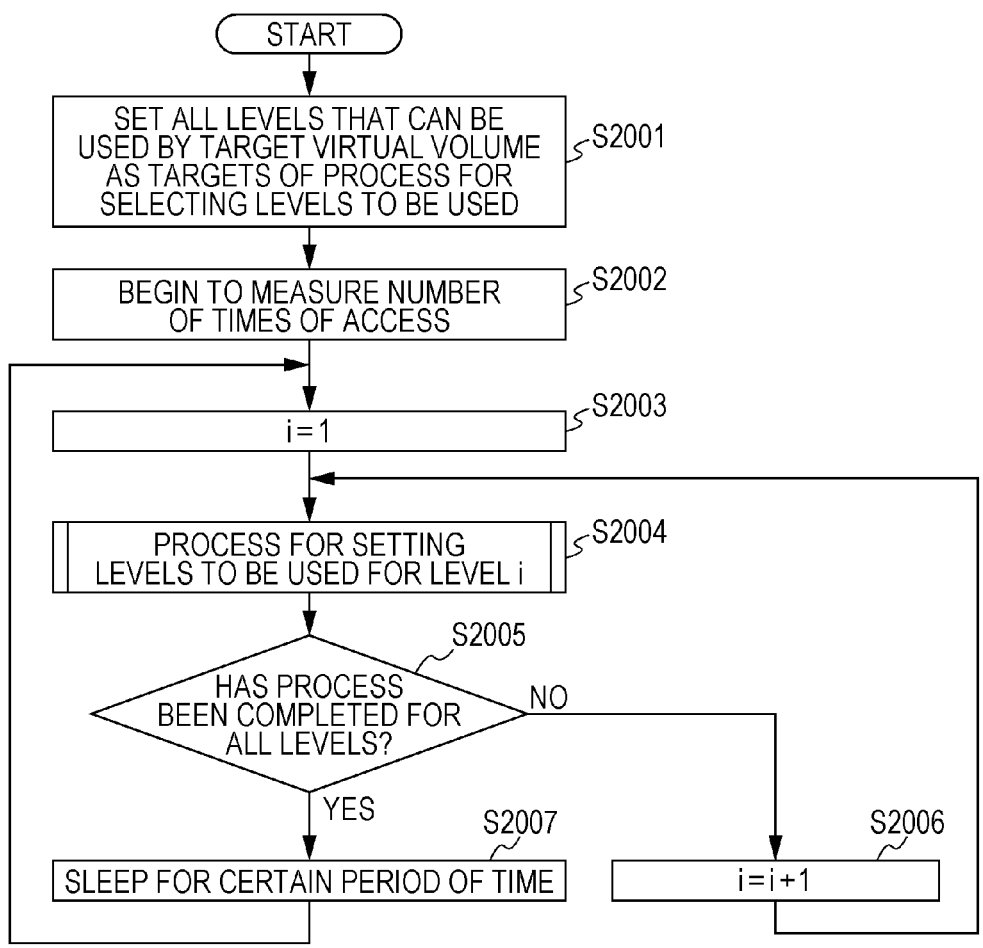
FIG. 20 is a flowchart illustrating an example of the procedure of a process for selecting levels to be used.
Figure 21:
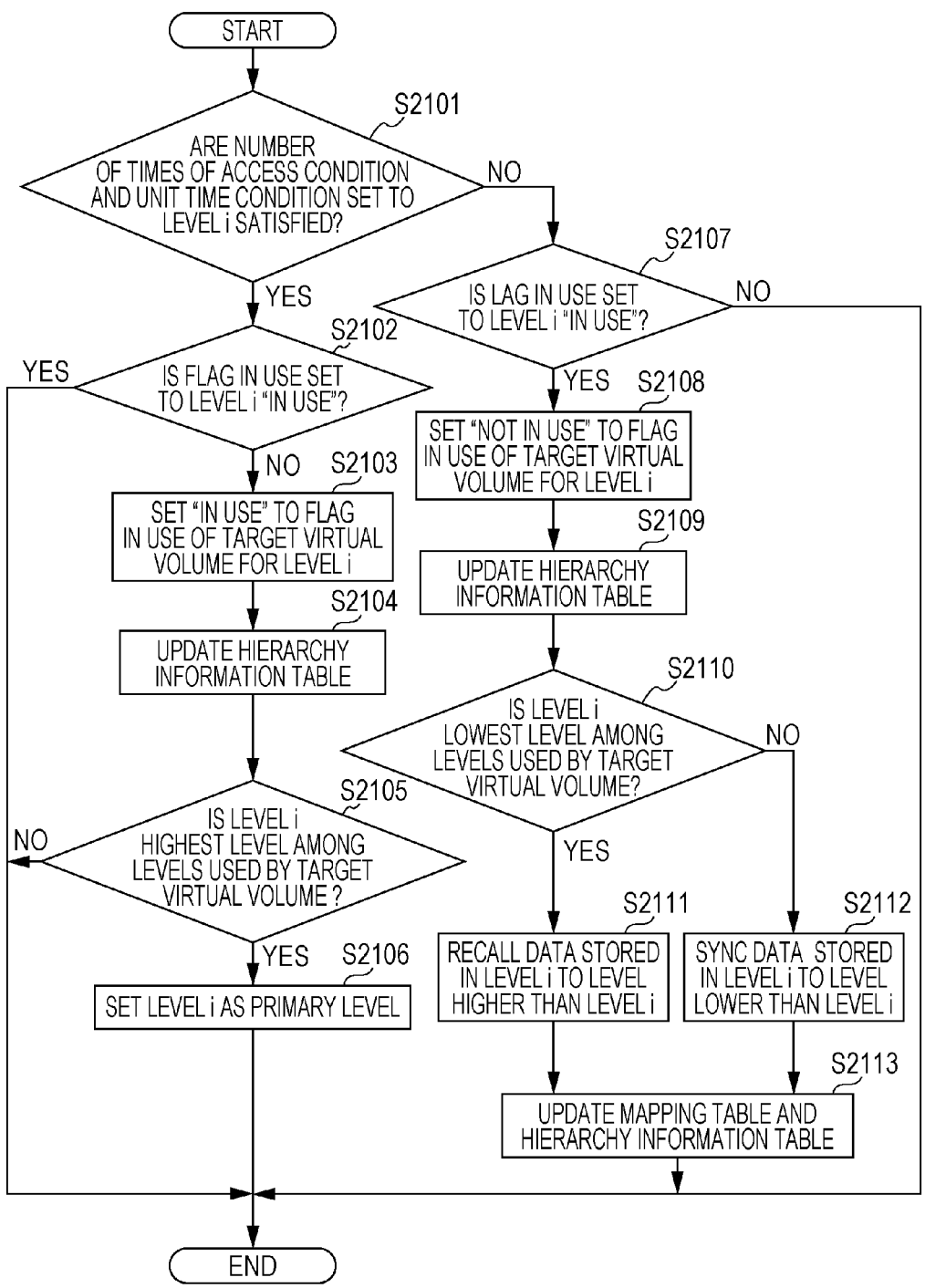
FIG. 21 is a flowchart illustrating an example of the procedure of a process for setting levels to be used for Level i.

FIG. 20 is a flowchart illustrating an example of the procedure of a process for selecting levels to be used. The process for selecting levels to be used is a process for selecting levels to be used from a group of levels. In addition, the process for selecting levels to be used is executed at certain time intervals after a virtual volume is created. In addition, the process for selecting levels to be used is executed for each virtual volume. In FIGS. 20 and 21, one of a plurality of virtual volumes is determined as a target. The virtual volume determined as a target will be referred to as a "target virtual volume" in FIGS. 20 and 21.

The storage control apparatus 101#1 sets all levels that can be used by a target virtual volume as targets of the process for selecting levels to be used (step S2001). Next, the storage control apparatus 101#1 begins to measure the number of times of access (step S2002). Next, the storage control apparatus 101#1 sets 1 to a variable i (step S2003). Next, the storage control apparatus 101#1 executes the process for setting levels to be used for Level i (step S2004). The process for setting levels to be used will be described later with reference to FIG. 21.

Next, the storage control apparatus 101#1 determines whether or not the process for setting levels to be used has been completed for all the levels (step S2005). If there is a level for which the process for setting levels to be used has not been executed (NO in step S2005), the storage control apparatus 101#1 increases the variable i by 1 (step S2006). Next, the storage control apparatus 101#1 proceeds to the processing in step S2004.

If the process for setting levels to be used has been completed for all the levels (YES in step S2005), the storage control apparatus 101#1 sleeps for a given period of time (step S2007). Next, the storage control apparatus 101#1 proceeds to the processing in step S2003. By executing the process for selecting levels to be used, the hierarchical storage system 100 may optimize the levels to be used by a virtual volume.

FIG. 21 is a flowchart illustrating an example of the procedure of a process for setting levels to be used for Level i. The process for setting levels to be used for Level i is a process for setting each level as a level in use or an unused level.

The storage control apparatus 101#1 refers to the access characteristic threshold table 701 and determines whether or not a record in the access characteristic table 801 regarding the target virtual volume satisfies the number of times of access condition and the unit time condition set to Level i (step S2101). If the conditions are satisfied (YES in step S2101), the storage control apparatus 101#1 determines whether or not the flag in use set to Level i is "in use" (step S2102). If the flag in use is "not in use" (NO in step S2102), the storage control apparatus 101#1 sets "in use" to the flag in use of the target virtual volume for Level i (step S2103). Next, the storage control apparatus 101#1 updates the hierarchy information table 601 (step S2104).

Next, the storage control apparatus 101#1 determines whether or not Level i is the highest level among the levels used by the target virtual volume (step S2105). If Level i is the highest level (YES in step S2105), the storage control apparatus 101#1 sets Level i as the primary level (step S2106).

After executing step S2106, or if the flag in use is "in use" (YES in step S2102), or if Level i is not the highest level (NO in step S2105), the storage control apparatus 101#1 ends the process for setting levels to be used for Level i.

If the conditions are not satisfied (NO in step S2101), the storage control apparatus 101#1 determines whether or not the flag in use set to Level i is "in use" (step S2107). If the flag in use is "in use" (YES in step S2107), the storage control apparatus 101#1 sets the flag in use of the target virtual volume for Level i to "not in use" (step S2108). Next, the storage control apparatus 101#1 updates the hierarchy information table 601 (step S2109).

Next, the storage control apparatus 101#1 determines whether or not Level i is the lowest level among the levels used by the target virtual volume (step S2110). If Level i is the lowest level (YES in step S2110), the storage control apparatus 101#1 recalls data stored in Level i to a level higher than Level (step S2111). On the other hand, if Level i is not the lowest level (NO in step S2110), the storage control apparatus 101#1 syncs data stored in Level i to a level lower than Level i (step S2112).

After executing step S2111 or S2112, the storage control apparatus 101#1 updates the mapping table 501 and the hierarchy information table 601 (step S2113). After executing step S2113, or if the flag is use is "not in use" (NO in step S2107), the storage control apparatus 101#1 ends the process for setting levels to be used for Level i. By executing the process for setting levels to be used for Level i, the hierarchical storage system 100 may switch each level between in use and not in use in accordance with the access frequency.

As described above, according to the storage control apparatus 101, data to be moved is moved while identifying a level whose condition of performance for response, which is set to each level, is satisfied by the data to be moved stored in a source level in a group of levels whose performance for response is different. In doing so, since data that is likely to be accessed frequently is moved to a level whose performance for response is high, the storage control apparatus 101 may improve the performance for response to the data that is likely to be accessed frequently.

According to the storage control apparatus 101, the range of elapsed time that serves as a condition set to each level may be calculated on the basis of the performance for response of each level such that the upper limit value or the lower limit value of the range of elapsed time that serves as a condition becomes smaller as the performance for response of each level becomes higher. Data that is likely to be accessed frequently is moved to a level whose performance for response is high since the elapsed time thereof is short. Therefore, the storage control apparatus 101 may improve the performance for response to the data that is likely to be accessed frequently.

According to the storage control apparatus 101, the range of elapsed time that serves as a condition set to each level may be calculated on the basis of the storage capacity of each level such that the range of elapsed time that serves as a condition becomes larger as the storage capacity of each level becomes larger. In doing so, the hierarchical storage system 100 may store a large amount of data in a level whose storage capacity is large. In addition, even when the storage capacity dynamically changes, the storage control apparatus 101 may set the range of elapsed time that serves as a condition in accordance with a state after the change.

According to the storage control apparatus 101, the range of elapsed time that serves as a condition set to each level may be calculated on the basis of the ratio of the total storage capacity of a group of levels whose performance for response is higher than that of each level in a group of levels to the total storage capacity of the group of levels. In doing so, the hierarchical storage system 100 may move data that is likely to be accessed frequently to a level whose performance for response is high, as well as storing a large amount of data in a level whose storage capacity is large.

According to the storage control apparatus 101, data stored in an unused level may be moved to another level different from unused levels in a group of levels. In doing so, the storage control apparatus 101 may limit levels to be used in the group of levels. By limiting the levels to be used, the number of levels to be controlled decreases, thereby reducing processing time. For example, when a virtual volume is searched, the processing time may be reduced since the number of target levels decreases. In addition, if there is a level that is not used by all virtual volumes, the storage control apparatus 101 may cause the level to enter a sleep mode in order to suppress power consumption.

According to the storage control apparatus 101, a condition of the number of access requests in unit time under which an unused storage is determined may be stored, and the number of access requests in unit time may be measured in order to search for a level that satisfies the condition. In doing so, the storage control apparatus 101 may enable the user to use an optimal level even without making the user aware of it.

According to the storage control apparatus 101, a condition of the number of periods that satisfy the number of access requests in unit time in a given period of time under which an unused storage is determined may be stored, and the number of access requests in unit time may be measured in order to search for a level that satisfies the condition. For example, the storage control apparatus 101 may enable the user to use an optimal level according to the storage capacity by setting the condition of the number of periods to be large for a level whose storage capacity is large.

According to the storage control apparatus 101, if the number of access requests in a given period of time is equal to or more than a certain value, data for which the access requests have been issued may be moved from a level storing the data to a level whose performance for response is higher than the level storing the data. In doing so, the storage control apparatus 101 may recall data that is likely to be accessed frequently in the future to a level whose performance for response is high, and accordingly the recall process does not have to be performed redundantly, thereby suppressing the sync process.

The hierarchical storage system 100 may store data in an appropriate level according to the value of the data by determining a sync destination level in accordance with the value of the data. In addition, the hierarchical storage system 100 may construct a system having an arbitrary number of levels of recording media and storages by providing the storage control apparatus 101 in the network layer between the servers se1 to se3 and the storages st1 to st5. In addition, the hierarchical storage system 100 may replace storages while keeping performing the operations thereof by moving data while mirroring virtual volumes that serve as old storages and virtual volumes that serve as new storages.

The method for controlling storages described in the present embodiment may be realized by executing a program prepared in advance using a computer such as a personal computer or a work station. The storage control program is recorded on a computer-readable recording medium such as a hard disk, a flexible disk, a compact disc read-only memory (CD-ROM), a magneto-optical (MO) disk, or a digital versatile disc (DVD), and executed when read by the computer from the recording medium. The storage control program may be distributed through a network such as the Internet.

Furthermore, the following claims are disclosed for the above-described embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method, executed by a computer, for controlling storages, comprising:
    obtaining time elapsed since data to be moved in a source storage in three or more storages whose performance for response to an access request is different is accessed in accordance with the access request;
    identifying, from the storages, a destination storage that meets condition under which the data to be moved in the source storage is moved, based on the obtained elapsed time by referring to a storage unit that stores the condition under which data is moved to each of the storages; and
    moving the data to be moved in the source storage to the identified destination storage.

2. The method according to claim 1, further comprising:
    calculating a range of elapsed time that serves as the condition associated with each of the storages based on the performance for response of each of the storages such that an upper limit value or a lower limit value of the range of elapsed time that serves as the condition becomes smaller as the performance for response of each of the storages becomes higher; and
    storing the calculated range of elapsed time associated with each of the storages as the condition in the storage unit,
    wherein, in the identifying, a destination storage having the condition that satisfies the range of elapsed time that includes the obtained elapsed time is identified from among the storages by referring to the storage unit.

3. The method according to claim 1, further comprising:
    calculating a range of elapsed time that serves as the condition associated with each of the storages based on a storage capacity of each of the storages such that the range of elapsed time that serves as the condition becomes larger as the storage capacity of each of the storages becomes larger; and
    storing the calculated range of elapsed time associated with each of the storages as the condition in the storage unit,
    wherein, in the identifying, a destination storage having the condition that satisfies the range of elapsed time that includes the obtained elapsed time is identified from among the storages by referring to the storage unit.

4. The method according to claim 1, further comprising:
calculating a range of elapsed time that serves as the condition associated with each of the storages based on a ratio of a total storage capacity of the storages whose performance for response is higher than that of each of the storages to a total storage capacity of the storages; and
storing the calculated range of elapsed time associated with each of the storages as the condition in the storage unit,
wherein, in the identifying, a destination storage having the condition that satisfies the range of elapsed time that includes the obtained elapsed time is identified from among the storages by referring to the storage unit.

5. The method according to claim 1, further comprising:
moving data stored in a certain storage in the storages to one of other storages in the storages different from the certain storage,
wherein, in the obtaining, after the data is moved to one of the other storages, time elapsed since the data moved from the certain storage to one of the other storages is accessed in accordance with the access request is obtained, wherein, in the identifying, a destination storage having the condition that satisfies the range of elapsed time that includes the obtained elapsed time is identified from among the other storages by referring to the storage unit.

6. The method according to claim 5, further comprising:
wherein the storage unit stores condition including the number of access requests in unit time for each of the storages,
measuring the number of access requests in unit time; and
searching, from the storages, a certain storage having the condition that satisfies the measured number of access requests in unit time by referring to the condition of the number of access requests in unit time in the storage unit,
wherein, in the moving, the data stored in the certain storage is moved to the other storages when the certain storage is searched.

7. The method according to claim 6, wherein the storage unit stores condition of the number of periods satisfying the number of access requests in unit time in a given period of time for each of the storages, wherein, in the measuring, the number of access requests in unit time is measured in the given period of time, and wherein, in the searching, from the storages, the certain storage having the condition that satisfies the measured number of access requests in unit time in the given period of time is searched by referring to the condition of the number of access requests in unit time in the given period of time in the storage unit.

8. The method according to claim 1, further comprising:
determining whether or not the number of access requests in a given period of time is equal to or larger than a given value after the data to be moved is moved upon receiving the access request; and
moving, when it is determined that the number of access requests in the given period of time is equal to or larger than the given value, data accessed by the access requests from a storage in the storages that stores the data accessed by the access requests to a storage whose performance for response is higher than that of the storage in the storages that stores the data accessed by the access requests.

9. A storage control apparatus comprising:
a memory; and
a processor to control the storage controller according to a process including:
obtaining time elapsed since data to be moved in a source storage in the storages whose performance for response to an access request is different is accessed in accordance with the access request;
identifying, from the storages, a destination storage that meets the condition under which the data to be moved in the source storage is moved, based on the obtained elapsed time by referring to the memory that stores the condition under which data is moved to each of the storages; and
moving the data to be moved from the source storage to the identified destination storage.

* * * * *